(12) United States Patent
Miyasaka

(10) Patent No.: US 11,724,414 B2
(45) Date of Patent: Aug. 15, 2023

(54) DEFIBRATED MATERIAL MANUFACTURING DEVICE

(71) Applicant: SEIKO EPSON CORPORATION, Tokyo (JP)

(72) Inventor: Yoichi Miyasaka, Nagano (JP)

(73) Assignee: Seiko Epson Corporation, Tokyo (JP)

(*) Notice: Subject to any disclaimer, the term of this patent is extended or adjusted under 35 U.S.C. 154(b) by 1174 days.

(21) Appl. No.: 16/048,605

(22) Filed: Jul. 30, 2018

(65) Prior Publication Data

US 2019/0030750 A1 Jan. 31, 2019

(30) Foreign Application Priority Data

Jul. 31, 2017 (JP) ................. 2017-148134

(51) Int. Cl.
| | |
|---|---|
| *B27N 3/00* | (2006.01) |
| *B27N 3/04* | (2006.01) |
| *D21B 1/08* | (2006.01) |
| *B27N 3/12* | (2006.01) |
| *D21F 9/00* | (2006.01) |
| *D21B 1/06* | (2006.01) |
| *D21B 1/02* | (2006.01) |

(52) U.S. Cl.
CPC ............ *B27N 3/007* (2013.01); *B27N 3/002* (2013.01); *B27N 3/04* (2013.01); *B27N 3/12* (2013.01); *D21B 1/02* (2013.01); *D21B 1/06* (2013.01); *D21B 1/08* (2013.01); *D21F 9/00* (2013.01)

(58) Field of Classification Search
CPC .......... B27N 3/007; B27N 3/002; B27N 3/04; B27N 3/12; D21B 1/02; D21B 1/06; D21B 1/08; D21B 1/10; D21F 9/00; D21F 9/02; D21H 23/20
See application file for complete search history.

(56) References Cited

U.S. PATENT DOCUMENTS

| | | | |
|---|---|---|---|
| 2011/0111456 A1* | 5/2011 | Medoff | C13K 1/02 435/68.1 |
| 2012/0024490 A1 | 2/2012 | Tamai et al. | |
| 2012/0227919 A1* | 9/2012 | Zhong | D21F 1/0018 162/157.3 |

(Continued)

FOREIGN PATENT DOCUMENTS

| | | | |
|---|---|---|---|
| CA | 2029128 A1 * | 11/1991 | ............ B03B 9/061 |
| CN | 102345239 B | 9/2015 | |

(Continued)

*Primary Examiner* — Eric Hug
*Assistant Examiner* — Elisa H Vera
(74) *Attorney, Agent, or Firm* — Global IP Counselors, LLP

(57) ABSTRACT

A defibrated material manufacturing device is configured to defibrate a feedstock of clumps of shreds containing fiber into defibrated material. The defibrated material manufacturing device has a removal device, a metering device, storage device, and a defibrator. The removal device is configured to remove at least a part of foreign matter contained in the feedstock. The metering device is configured to measure the feedstock that has passed the removal device. The storage device is configured to store a measured feedstock measured by the metering device. The defibrator is configured to defibrate the measured feedstock supplied from the storage device into the defibrated material.

14 Claims, 6 Drawing Sheets

(56) References Cited

U.S. PATENT DOCUMENTS

| | | | |
|---|---|---|---|
| 2013/0292228 A1* | 11/2013 | Webb .................. | D21B 1/08 |
| | | | 198/459.5 |
| 2014/0027075 A1* | 1/2014 | Yamagami ............ | D21C 5/025 |
| | | | 162/4 |
| 2014/0262095 A1* | 9/2014 | Kemp .................. | C02F 1/32 |
| | | | 162/190 |
| 2014/0352902 A1* | 12/2014 | Althofer .............. | D21B 1/06 |
| | | | 162/141 |
| 2014/0374047 A1 | 12/2014 | Yamagami | |
| 2016/0010278 A1 | 1/2016 | Yamagami et al. | |
| 2016/0332333 A1 | 11/2016 | Yamagami et al. | |
| 2017/0175338 A1* | 6/2017 | Mohammadi .......... | D21H 11/12 |
| 2017/0198434 A1 | 7/2017 | Yamagami | |
| 2018/0169707 A1* | 6/2018 | Laitt .................. | B07C 5/14 |

FOREIGN PATENT DOCUMENTS

| | | |
|---|---|---|
| GB | 1498108 A | 1/1978 |
| JP | 2006-104633 A | 4/2006 |
| JP | 2011-032607 A | 2/2011 |
| JP | 2012-144819 A | 8/2012 |

* cited by examiner

DEFIBRATED MATERIAL MANUFACTURING DEVICE

CROSS-REFERENCE TO RELATED APPLICATIONS

This application claims priority to Japanese Patent Application No. 2017-148134 filed on Jul. 31, 2017. The entire disclosure of Japanese Patent Application No. 2017-148134 is hereby incorporated herein by reference.

BACKGROUND

Technical Field

The present invention relates to a defibrated material manufacturing device for producing defibrated material suitable for manufacturing paper and other types of sheet products, and to a sheet manufacturing apparatus to which the defibrated material manufacturing device is disposed.

Related Art

A recovered paper recycling system (defibrated material manufacturing device) capable of removing foreign matter contained in recovered paper feedstock, and producing fine fragments of particles (defibrated material), is known from the literature. See, for example, JP-A-2006-104633.

The recovered paper recycling system (defibrated material manufacturing device) described in JP-A-2006-104633 has a primary removal means for removing foreign matter contained in recovered paper, a shredding means for comminuting recovered paper feedstock from which foreign matter was removed, a secondary removal means for removing residual foreign matter contained in the shredded recovered paper feedstock, and a pulverizing means for grinding the shredded recovered paper feedstock to a powder.

The primary removal means removes large metals contained in the recovered paper feedstock by a plate magnet, and the shredding means shreds the recovered paper feedstock after removing large metals together with other remaining foreign matter. The secondary removal means removes residual foreign matter of high specific gravity by means of a specific gravity classifier, then removes small metal particles by means of a roller magnet with strong magnetic force, and then detects the presence of metals with a metal detector. The pulverizing means then pulverizes the recovered paper feedstock after checking for metal, and produces a powder (defibrated material) that becomes feedstock for paper.

As a result, small foreign matter is removed from the recovered paper feedstock, and the recovered paper feedstock recycling efficiency can be improved.

However, because the amount of recovered paper feedstock introduced to the pulverizing means is not known in the recovered paper recycling system (defibrated material manufacturing device) described in JP-A-2006-104633, supplying a specific amount of recovered paper feedstock from which metals and other foreign matter was removed to the pulverizing means, and controlling the amount of powder (defibrated material) produced by the pulverizing means, is difficult.

For example, when the recovered paper recycling system (defibrated material manufacturing device) described in JP-A-2006-104633 is applied to a sheet manufacturing apparatus that produces new paper, controlling the amount of powder (defibrated material), and controlling density and thickness of the new paper manufactured from the powder (defibrated material) as feedstock, is difficult. A recovered paper recycling system (defibrated material manufacturing device) suitable for a sheet manufacturing apparatus that manufactures (recycles) new paper is therefore desirable.

SUMMARY

The present invention is directed to solving at least part of the foregoing problem, and can be achieved by the embodiments or examples described below.

According to an aspect of the invention, a defibrated material manufacturing device is configured to defibrate a feedstock of clumps of shreds containing fiber into defibrated material. The defibrated material manufacturing device comprises a removal device, a metering device, storage device, and a defibrator. The removal device is configured to remove at least a part of foreign matter contained in the feedstock. The metering device is configured to measure the feedstock that has passed the removal device. The storage device is configured to store a measured feedstock measured by the metering device. The defibrator is configured to defibrate the measured feedstock supplied from the storage device into the defibrated material.

According to an aspect of the invention, the defibrated material manufacturing device further comprises a conveyance device configured to convey the feedstock by vibration. The removal device is disposed on a downstream side of the conveyance device in a conveyance direction of the feedstock.

According to an aspect of the invention, the metering device and the storage device are configured in unison.

According to an aspect of the invention, the removal device has a first magnet configured to attract at least the part of the foreign matter.

According to an aspect of the invention, the removal device further has a rotating shaft rotationally supporting the first magnet, the first magnet is a member long in an axial direction of the rotating shaft. The removal device is disposed so as to contact the feedstock dropping in a direction of gravity, and the first magnet has a side on the opposite side as the direction of gravity and to which the feedstock drops in the direction of gravity.

According to an aspect of the invention, the removal device further has resin that coats the first magnet.

According to an aspect of the invention, the removal device further has a scraper configured to remove from the removal device at least the part of the foreign matter accreted on the removal device.

According to an aspect of the invention, the defibrated material manufacturing device further comprises a second magnet disposed away from the feedstock dropping in the direction of gravity. The first magnet is disposed to attract at least the part of the foreign matter of the feedstock dropping in the direction of gravity, and the removal device is configured to position the first magnet at a position away from the feedstock dropping in the direction of gravity, and position the second magnet to attract at least the part of the foreign matter of the feedstock dropping in the direction of gravity.

According to an aspect of the invention, the feedstock includes recovered paper.

According to an aspect of the invention, the metering device and the storage device are integrated as one-piece body.

According to an aspect of the invention, the defibrated material manufacturing device further comprises a second magnet movably disposed between a position away from the feedstock dropping in the direction of gravity and a position to attract at least the part of the foreign matter of the feedstock dropping in the direction of gravity. The first magnet is movably disposed between the position to attract at least the part of the foreign matter of the feedstock dropping in the direction of gravity and the position away from the feedstock dropping in the direction of gravity.

According to another aspect of the invention, a defibrated material manufacturing device is configured to defibrate a feedstock of clumps of shreds containing fiber into defibrated material. The defibrated material manufacturing device comprises one of a magnetic removal device and a cyclone classifier; a cell load; a container; and a defibrator. The one of the magnetic removal device and the cyclone classifier is configured to remove at least a part of foreign matter contained in the feedstock. The cell load is configured to measure the feedstock that has passed the one of the magnetic removal device and the cyclone classifier. The container is configured to store a measured feedstock measured by the cell load. The defibrator is configured to defibrate the measured feedstock supplied from the container into the defibrated material.

BRIEF DESCRIPTION OF THE DRAWINGS

Referring now to the attached drawings which form a part of this original disclosure.

DETAILED DESCRIPTION OF EXEMPLARY EMBODIMENTS

A preferred embodiment of the invention is described below with reference to the accompanying figures. Note that layers (levels) and parts are shown in the accompanying figures in sizes enabling easy recognition thereof, and differ from the actual scale of the actual layers (levels) and parts.

Embodiments

Outline of a Sheet Manufacturing Apparatus

Figure 1:
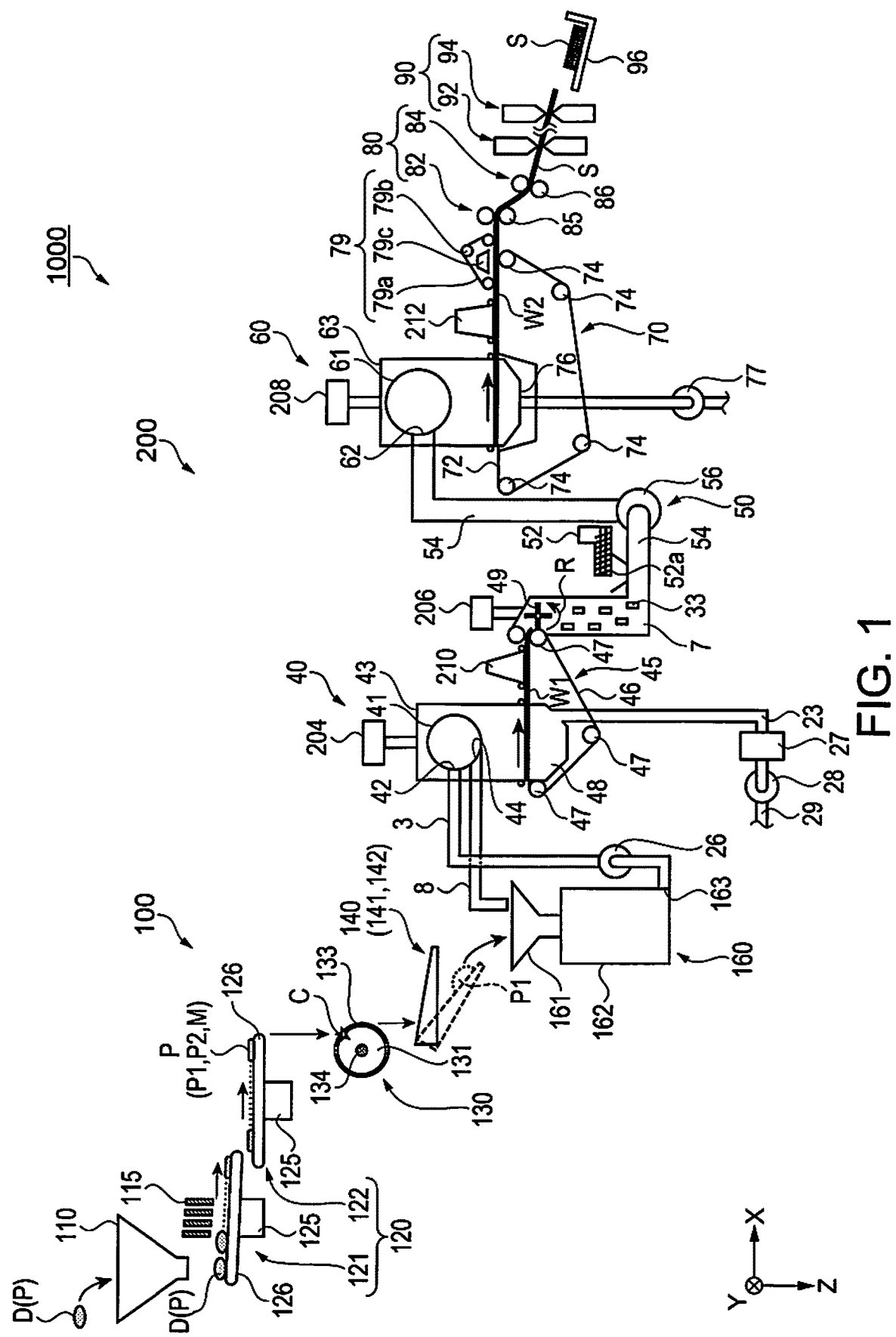
FIG. 1 schematically illustrates the configuration of a sheet manufacturing apparatus according to a preferred embodiment.

FIG. 1 schematically illustrates the configuration of a sheet manufacturing apparatus according to a first embodiment.

A sheet manufacturing apparatus 1000 according to this embodiment is described first with reference to FIG. 1.

Note that an X-axis, Y-axis, and Z-axis are shown in FIG. 1 as three mutually perpendicular axes of a three-dimensional space. Of the X-axis directions along the X-axis, the +X-axis direction is referred to below as the positive, or downstream, direction, and the −X-axis direction as the negative, or upstream, direction. Of the Y-axis directions along the Y-axis, the +Y-axis direction is referred to below as the positive direction, and the −Y-axis direction as the negative direction. Of the Z-axis directions along the Z-axis, the +Z-axis direction is referred to below as the positive direction, and the −Z-axis direction as the negative direction. In other words, the direction pointed to by the arrows indicating the axial direction is referred to as the +direction (positive, or forward, direction), and the side at the origin (base) of the indicated direction is the −direction (negative direction). In addition, the XY plane is the horizontal plane, and the +Z-axis direction is the direction of gravity. In addition, the XYZ axes in FIG. 1 are the same as the XYZ axes in the other figures.

Note that the −Z-axis direction is an example of the opposite direction as the direction of gravity, the +X-axis direction is an example of the conveyance direction, and the Y-axis is an example of the axial direction of axes of rotation.

The sheet manufacturing apparatus 1000 according to this embodiment produces new paper (cut sheets) by defibrating, in a dry process, recovered paper that has already been used, such as confidential documents, detangling the defibrated material into individual fibers, applying pressure and heat to form a web, and then cutting the web. By mixing various additives to the defibrated material resulting from defibrating recovered paper and detangling the fibers, the sheet manufacturing apparatus 1000 can also improve the strength and whiteness, and impart desired properties such as color, scent, and flame resistance, according to the intended application of the finished paper products. By controlling the density, thickness, and form of the paper, the sheet manufacturing apparatus 1000 can also produce paper of various thicknesses and sizes, including A4 and A3 size office paper, and business cards, according to the application.

As shown in FIG. 1, the sheet manufacturing apparatus 1000 includes a defibrated material manufacturing device 100 for defibrating feedstock such as shreds of paper (recovered paper) containing fiber into defibrated material, and a recycled paper manufacturing system 200 that produces new paper (sheets S) from the defibrated material. The defibrated material manufacturing device 100 is disposed on the −X-axis direction side, and the recycled paper manufacturing system 200 is disposed on the +X-axis direction side.

The defibrated material manufacturing device 100 defibrates feedstock such as shreds of paper (recovered paper) containing fiber into defibrated material, and supplies the defibrated material to the recycled paper manufacturing system 200. The defibrated material is feedstock such as paper shreds (recovered paper) that has been broken down until the original shape is lost and is defibrated into individual fibers. Included in the defibrated material are the detangled fibers of the feedstock, and impurities (such as resins bonding fibers together, color agents such as ink and toner, bleeding inhibitors, strengthening agents, and other additives) that are separated from the fibers as the feedstock is defibrated.

The configuration of the defibrated material manufacturing device 100 is described in detail below.

The recycled paper manufacturing system 200 includes a screener 40 that classifies the defibrated material supplied from the defibrated material manufacturing device 100 based on the length of the fibers; a separator 45 that removes impurities from the defibrated material; a mixing device 50 that mixes resin with the defibrated material; a web forming device 70 that forms a web from the mixture of defibrated material and resin; and a sheet forming device 80 that forms a sheet S by applying either or both a compression process and a heating process to the web. More specifically, the recycled paper manufacturing system 200 has, disposed sequentially along the conveyance path through which the defibrated material and web are conveyed, the screener 40, the separator 45, a rotor 49, the mixing device 50, an air-laying device 60, the web forming device 70, a supply device 79, the sheet forming device 80, and a cutting device 90.

The sheet manufacturing apparatus 1000 according to this embodiment includes the defibrated material manufacturing device 100, the mixing device 50 that mixes the defibrated material supplied from the defibrated material manufacturing device 100 with resin, the web forming device 70 that forms a web (second web W2) from the mixture of defibrated material and resin, and the sheet forming device 80 that forms a sheet S by applying either or both a compression process and a heating process to the web (second web W2).

The recycled paper manufacturing system 200 also has wetting devices 204, 206, 208, 210, 212 for wetting the defibrated material and webs W1, W2, and/or the spaces through which the defibrated material and webs W1, W2 move.

The wetting devices 204, 206, 208 are evaporative or warm air vaporization humidifiers with a filter (not shown in the figure) that is wetted with water, and supply humidified air with a high humidity level by passing air through the wet filter.

The wetting device 210 and wetting device 212 are ultrasonic humidifiers, have a vibrator (not shown in the figure) that atomizes water, and supplies mist produced by the vibrator.

Note that the specific configuration of the wetting devices 204, 206, 208, 210, 212 may be designed as desired, and steam, evaporative, warm air vaporization, ultrasonic, or other type of humidification method may be used.

The defibrated material manufacturing device 100 and screener 40 are connected by a conduit 3, and a defibrator blower 26 is disposed to the conduit 3. The defibrated material produced by the defibrated material manufacturing device 100 is carried through the conduit 3 to the screener 40 by an air current produced by the defibrator blower 26.

The screener 40 has an inlet 42 into which the defibrated material defibrated by the defibrator 160 flows from the conduit 3 with the air current. The screener 40 classifies the defibrated material introduced from the inlet 42 based on fiber length. More specifically, the screener 40 separates the defibrated material defibrated by the defibrated material manufacturing device 100 into first screened material consisting of defibrated material of a predetermined size or smaller, and second screened material consisting of defibrated material that is larger than the first screened material. The first screened material contains both fiber and particulate. The second screened material includes, for example, large fibers, undefibrated clumps (shreds that have not be sufficiently defibrated), and clumps of agglomerated or tangled defibrated threads.

The screener 40 has a drum 41, and a housing 43 enclosing the drum 41.

The drum 41 is a cylindrical sieve driven rotationally by a motor. The drum 41 has mesh (filter, screen), and functions as a sieve. By appropriately setting the size of the mesh, the drum 41 separates the defibrated material introduced from the inlet 42 into the first screened material that is smaller than the mesh openings, and the second screened material that is larger than the mesh. The mesh of the drum 41 may be a metal screen, expanded metal made by expanding a metal sheet with slits formed therein, or punched metal having holes formed by a press in a metal sheet, for example.

The defibrated material introduced from the inlet 42 is conveyed with the air current into the drum 41, and the first screened material drops through the mesh of the drum 41 as the drum 41 turns. The second screened material that cannot pass through the mesh of the drum 41 flows with the air current introduced from the inlet 42 to the drum 41 to an outlet 44, is conveyed through another conduit 8 and returned through the conduit 8 to the defibrator 160 of the defibrated material manufacturing device 100, and is defibrated again.

The first screened material classified by the drum 41 is dispersed in air through the mesh of the drum 41, and drops onto a mesh belt 46 of the separator 45 located below the drum 41.

The separator 45 includes the mesh belt 46 (sorting belt), rollers 47, and a suction device 48 (suction mechanism). The mesh belt 46 is an endless belt, is tensioned by three tension rollers 47, and moves in the direction indicated by the arrow in the figure by operation of the tension rollers 47. The surface of the mesh belt 46 is configured by mesh with openings of a specific size. Of the first screened material that drops from the drum 41, particulate of a size that passes through the mesh drops from the mesh belt 46, and fiber that is too large to pass through the mesh accumulates on the mesh belt 46, and is conveyed with the mesh belt 46 in the direction of the arrow.

The particulate that drops from the mesh belt 46 includes impurities that are not suited to manufacturing sheets S, including defibrated material that is relatively small or low in density (such as resin particulate, color agents, and other additives). More specifically, the separator 45 removes impurities from the first screened material that are not suited to manufacturing a sheet S. The remnants of the first screened material after impurities are removed by the separator 45 are material that is suited to manufacture a sheet S, and accumulate on the mesh belt 46, forming a first web W1.

Below the mesh belt 46 (on the +Z-axis direction side) is disposed the suction device 48 that suctions air from below the mesh belt 46. Below the suction device 48 (on the +Z-axis direction side) are disposed a dust collector 27 and a collection blower 28. The suction device 48 and dust collector 27 are connected by a conduit 23, and the dust collector 27 and collection blower 28 are connected by a conduit 29.

The collection blower 28 suctions air through the dust collector 27 and suction device 48. When the collection blower 28 suctions air through the dust collector 27 and suction device 48, particulate that has passed through the mesh of the mesh belt 46 is suctioned with the air, and is conveyed through the conduit 23 to the dust collector 27. The dust collector 27 separates and collects from the air current particulate that has passed through the mesh belt 46. Air discharged by the collection blower 28 passes through the conduit 29 and is discharged to the outside of the recycled paper manufacturing system 200.

The fiber of the first screened material from which impurities were removed accumulates on top of the mesh belt 46, forming a first web W1. The suction force of the collection blower 28 promotes formation of the first web W1 on the mesh belt 46 while impurities are also quickly removed.

Moist air is supplied by the wetting device 204 to the space enclosing the drum 41. This moist air wets the first screened material inside the screener 40. As a result, accretion of the first screened material on the mesh belt 46 by static electricity is reduced, and the first screened material can be easily separated from the mesh belt 46. Accretion of the first screened material by static electricity on the rotor 49 and the inside walls of the housing 43 can also be suppressed. In addition, impurities can be efficiently suctioned by the suction device 48.

Note that the configuration in the recycled paper manufacturing system 200 for screening and separating the defibrated material into the first screened material and the second screened material is not limited to a screener 40 with a drum 41. For example, a configuration that uses a classifier to classify defibrated material defibrated by the defibrated material manufacturing device 100 may be used. Examples of such a classifier include cyclone classifiers, elbow jet classifiers, and eddy classifiers. If such a classifier is used, the defibrated material can be selectively separated into the first screened material and the second screened material. In addition, a configuration that separates and removes impurities including relatively small or low density matter (such as resin particles, color agents, and other additives) from the defibrated material can be configured by using such a classifier. This enables a configuration that, for example, returns the second screened material to the defibrator 160 of the defibrated material manufacturing device 100, collects unwanted matter by the dust collector 27, and feeds the first screened material from which impurities have been removed to a conduit 54.

Air bearing mist is supplied to the conveyance path of the mesh belt 46 by the wetting device 210 downstream from the screener 40. The mist of water particles produced by the wetting device 210 supplies moisture to the first web W1. As a result, the water content of the first web W1 is adjusted and accretion of fiber to the mesh belt 46, for example, by static is suppressed.

The rotor 49 that breaks up the first web W1 accumulated on the mesh belt 46 is disposed on the downstream side of the mesh belt 46 in the conveyance direction of the first web W1. The first web W1 is separated from the mesh belt 46 and broken up by the rotor 49 at the position where the mesh belt 46 is returned to the upstream side by a roller 47.

The first web W1 is a soft web of accumulated fiber, and the rotor 49 detangles the fibers of the first web W1 into a form that can be easily mixed with resin by the mixing device 50 described below.

The rotor 49 may be configured as desired, and in this embodiment the rotor 49 has a rotor vane configuration of flat rotating blades. The rotor 49 is located at a position where the blades contact the first web W1 separated from the mesh belt 46. By rotation of the rotor 49 (for example, rotation in the direction indicated by the arrow R in the figure), the first web W1 separated and conveyed from the mesh belt 46 hits the blades of the rotor 49 and is broken up into fragments 33.

The rotor 49 is preferably positioned so that the blades of the rotor 49 do not contact the mesh belt 46. For example, if the distance between the tips of the blades of the rotor 49 and the mesh belt 46 is greater than or equal to 0.05 mm and less than or equal to 0.5 mm, the rotor 49 can efficiently fragment the first web W1 without damaging the mesh belt 46.

The fragments 33 cut by the rotor 49 drop through a conduit 7, and are carried to the mixing device 50 by the current flowing through the conduit 7.

Humidified air is supplied by the wetting device 206 to the space containing the rotor 49. As a result, the problem of fiber building up on the blades of the rotor 49 or the inside of the conduit 7 due to static can be suppressed. Furthermore, because air with a high humidity level is supplied to the mixing device 50 through the conduit 7, problems due to static can also be prevented in the mixing device 50.

The mixing device 50 has an additive supply device 52 that supplies an additive including resin, the conduit 54 that communicates with the conduit 7 and through which a current carrying the fragments 33 flows, and a mixing blower 56. As described above, the fragments 33 are fiber from which impurities have been removed from the first screened material. The mixing device 50 mixes an additive including resin with the fiber in the fragments 33.

In other words, the mixing device 50 mixes resin with defibrated material supplied from the defibrated material manufacturing device 100. While described further below, a process including at least one of compression and heating is applied to the mixture (second web W2) of resin and fiber (defibrated material) in the fragments 33 to manufacture a sheet S. To stabilize the quality of the sheet S, uniformly controlling the ratio of feedstock (defibrated material) and resin in the sheet S is important.

In the mixing device 50, an air current is produced by the mixing blower 56, and the fragments 33 and additive are mixed while being conveyed through the conduit 54. The fragments 33 are detangled into a finer fibrous state in the process of flowing through the conduit 7 and conduit 54.

The additive supply device 52 is connected to an additive cartridge (not shown in the figure) that stores the additive, and supplies the additive from the additive cartridge to the conduit 54. The additive supply device 52 temporarily stores an additive of powder or particulate inside the additive cartridge. The additive supply device 52 also has an outlet 52a that feeds the temporarily stored additive into the conduit 54.

Note that the additive cartridge may be configured to be removably installed to the additive supply device 52. The additive cartridge may also be configured so that additive can be replenished.

The outlet 52a includes a feeder (not shown in the figure) that feeds the additive stored in the additive supply device 52 to the conduit 54, and a shutter (not shown in the figure) that opens and closes the connection between the feeder and the conduit 54. When the shutter is closed, the path between the outlet 52a and conduit 54 is closed, and the supply of additive from the additive supply device 52 to the conduit 54 is stopped.

When the feeder of the outlet 52a is not operating, additive is not supplied from the outlet 52a to the conduit 54, but if there is negative pressure in the conduit 54, additive may flow through the conduit 54 even if the feeder of the outlet 52a is stopped. However, this flow of additive can be reliably stopped by closing the path that connects the feeder to the conduit 54 with the shutter.

The additive that the additive supply device 52 supplies includes resin for binding fibers. The resin contained in the additive is a thermoplastic resin or thermoset resin, such as AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be used individually or in a desirable combination. The additive may contain only a single material or a mixture, both of which may comprise multiple types of particulate each comprising a single or multiple materials. The additive supplied may also be a fibrous or powder form.

The resin contained in the additive melts when heated and binds multiple fibers together. As a result, the fibers in the mixture of fiber and resin are not bonded together until heated to the temperature at which the resin melts.

In addition to resin for binding fibers, and depending on the type of sheet being manufactured, the additive supplied from the additive supply device 52 may also include a coloring agent for coloring the fiber, an anti-blocking agent to prevent agglomeration of fibers and agglomeration of resin, or a flame retardant for making the fiber difficult to burn, for example. The additive not containing a coloring agent may be colorless or a color light enough to be considered colorless, or white.

The fragments 33 dropping through the conduit 7 and the additive supplied by the additive supply device 52 are pulled through the conduit 54 by the air current produced by the mixing blower 56, and pass through the mixing blower 56. The fiber in the fragments 33 and the additive are mixed by the air current produced by the mixing blower 56 and/or the action of a rotating part such as the blades of the mixing blower 56, and the mixture (a mixture of the first screened material and additive) is conveyed through the conduit 54 to the air-laying device 60.

The mechanism for mixing the fragments 33 (first screened material) and additive is not specifically limited, and may work by mixing with blades turning at high speed, or using rotation of a container similarly to a V blender, and the mechanism may be located before or after the mixing blower 56.

The air-laying device 60 deposits the first screened material (defibrated material defibrated by the defibrated material manufacturing device 100). More specifically, the mixture that has passed through the mixing device 50 is introduced from an inlet 62 to the air-laying device 60, and the air-laying device 60 detangles and disperses the tangled defibrated material (fiber) in air while the mixture precipitates. When the resin in the additive supplied from the additive supply device 52 is fibrous, the air-laying device 60 also detangles interlocked resin fibers. As a result, the air-laying device 60 can lay the mixture uniformly in the web forming device 70.

The air-laying device 60 has a drum 61 and a housing 63 that houses the drum 61. The drum 61 is a cylindrical sieve driven rotationally by a motor. The drum 61 has mesh (filter, screen), and functions as a sieve. Based on the size of the mesh, the drum 61 causes fiber and particles smaller than the size of the mesh (that pass through the mesh) to precipitate from the drum 61. The configuration of the drum 61 in this example is the same as the configuration of the drum 41 described above.

Note that the sieve of the drum 61 may be configured without functionality for selecting specific material. More specifically, the sieve used in the drum 61 means a device having mesh, and the drum 61 may cause all of the mixture introduced to the drum 61 to precipitate.

The web forming device 70 is disposed below the drum 61. The web forming device 70 accumulates the material precipitated from the air-laying device 60, forming a second web W2 as another example of a web. The web forming device 70 includes, for example, a mesh belt 72, tension rollers 74, and a suction mechanism 76.

The mesh belt 72 is an endless belt, is tensioned by multiple tension rollers 74, and by operation of the tension rollers 74 is driven in the direction indicated by the arrow in the figure. The mesh belt 72 may be metal, plastic, cloth, or nonwoven cloth. The surface of the mesh belt 72 is a screen with openings of a specific size. Of the fiber and particulate dropping from the drum 61, particulate of a size that passes through the mesh drops through the mesh belt 72, and fiber of a size that cannot pass through the openings in the mesh accumulates on the mesh belt 72 and is conveyed in the direction of the arrow with the mesh belt 72. The mesh belt 72 moves at a constant speed during the operation of making a sheet S.

In other words, the web forming device 70 forms the second web W2, which is an example of a web comprising a mixture of defibrated material and additive (resin).

The openings in the mesh of the mesh belt 72 are fine, and can be sized so that most of the fiber and particles dropping from the drum 61 does not pass through.

A suction mechanism 76 is disposed below the mesh belt 72 (on the opposite side as the air-laying device 60). The suction mechanism 76 includes a suction blower 77, and by the suction of the suction blower 77 produces a flow of air from the air-laying device 60 to the mesh belt 72.

The mixture distributed in air by the air-laying device 60 is pulled onto the mesh belt 72 by the suction mechanism 76. As a result, formation of the second web W2 on the mesh belt 72 is promoted, and the discharge rate from the air-laying device 60 can be increased. A downward air flow can also be created in the descent path of the mixture, and interlocking of defibrated material and additive during descent can be prevented, by the suction mechanism 76.

The suction blower 77 (air-laying suction device) may be configured to discharge from the recycled paper manufacturing system 200 air that has been suctioned from the suction mechanism 76 and has passed through a collection filter not shown. The suction blower 77 may push the suctioned air to the dust collector 27 to collect the impurities contained in the air suctioned by the suction mechanism 76.

Humidified air is supplied by the wetting device 208 to the space surrounding the drum 61. As a result, the inside of the air-laying device 60 can be humidified by the humidified air, fiber and particles accumulating on the housing 63 due to static electricity can be suppressed, fiber and particles can be made to precipitate quickly on the mesh belt 72, and a second web W2 of a desired form can be made.

A soft, fluffy second web W2 containing much air is thus formed by passing through the air-laying device 60 and web forming device 70. The second web W2 accumulated on the mesh belt 72 is then conveyed to the sheet forming device 80.

Air carrying mist is supplied by the wetting device 212 to the conveyance path of the mesh belt 72 on the downstream side of the air-laying device 60. As a result, mist generated by the wetting device 212 is supplied to the second web W2, and the water content of the second web W2 is adjusted. Accretion of fiber on the mesh belt 72 due to static electricity is also suppressed.

The supply device 79 that delivers the second web W2 on the mesh belt 72 to the sheet forming device 80 is also disposed on the downstream side of the conveyance path of the mesh belt 72. The supply device 79 includes, for example, a mesh belt 79*a*, rollers 79*b*, and a suction mechanism 79*c*.

The suction mechanism 79*c* includes a blower (not shown in the figure), and by the suction force of the blower produces an upward air current on the mesh belt 79*a*. This air current pulls the second web W2, and the second web W2 separates from the mesh belt 72 and sticks to the mesh belt 79*a*. The mesh belt 79*a* moves in conjunction with the rollers 79*b*, and conveys the second web W2 to the sheet forming device 80. In this example, the speed of the mesh belt 72 and the speed of the mesh belt 79*a* are the same.

In this way, the supply device 79 separates the second web W2 formed on the mesh belt 72 from the mesh belt 72, and conveys the second web W2 to the sheet forming device 80.

The sheet forming device 80 forms a sheet S from the precipitate (second web W2) deposited by the air-laying device 60. More specifically, the sheet forming device 80 forms a sheet S by compressing and heating the second web W2 delivered from the supply device 79. The sheet forming device 80, by applying heat to the fiber and additive contained in the second web W2, binds fibers in the mixture through the additive (resin).

The sheet forming device 80 has a compression device 82 that compresses the second web W2, and a heating device 84 that heats the second web W2 after being compressed by the compression device 82.

The compression device 82 in this example comprises a pair of calender rolls 85 that hold and compress the second web W2 with a specific nipping force. Calendering reduces the thickness of the second web W2 and increases the density of the second web W2. One of the pair of calender rolls 85 is a drive roller that is driven by a motor (not shown in the figure), and the other is a driven roller that turns in conjunction with the drive roller. The calender rolls 85 turn in response to the drive power from a motor (not shown in the figure), compress the second web W2, and convey a high density second web W2 resulting from compression to the heating device 84.

A heat roller (heating roller), hot press molding machine, hot plate, hot air blower, infrared heater, or flash fuser, for example, may be used as the heating device 84. In this embodiment, the heating device 84 comprises a pair of heat rollers 86. The heat rollers 86 are heated to a previously set temperature by a heater disposed internally or externally. The heat rollers 86 apply heat to both sides of the second web W2 compressed by the calender rolls 85, forming a sheet S. One of the pair of heat rollers 86 is a drive roller that is driven by a motor (not shown in the figure), and the other is a driven roller that turns in conjunction with the drive roller. The heat rollers 86 turn in response to the drive power from a motor (not shown in the figure), and convey sheet S formed from the second web W2 to the cutting device 90.

Note that the sheet forming device 80 is not limited to a configuration that forms a sheet S by applying pressure and heat to the second web W2, and may be a configuration that forms a sheet S by compressing the second web W2, or a configuration that forms a sheet S by heating the second web W2. In other words, the sheet forming device 80 may be any configuration that forms a sheet by a process including at least one of compressing and heating the second web W2 (web).

The cutting device 90 cuts and processes the sheet S formed by the sheet forming device 80 into sheets S of a specific size (cut sheets). More specifically in this example, the cutting device 90 has a first cutter 92 that cuts the sheet S crosswise to the conveyance direction of the sheet S, and a second cutter 94 that cuts the sheet S parallel to the conveyance direction. In this example, the second cutter 94 is located on the downstream side of the first cutter 92 in the conveyance direction of the sheet S. The sheet S formed by the sheet forming device 80 is cut by the first cutter 92 and second cutter 94 into single sheets of a specific size.

The cut sheets cut from the sheet S by the cutting device 90 are then discharged toward a tray 96, and stacked on the tray 96.

Summary of the Defibrated Material Manufacturing Device

Figure 2:
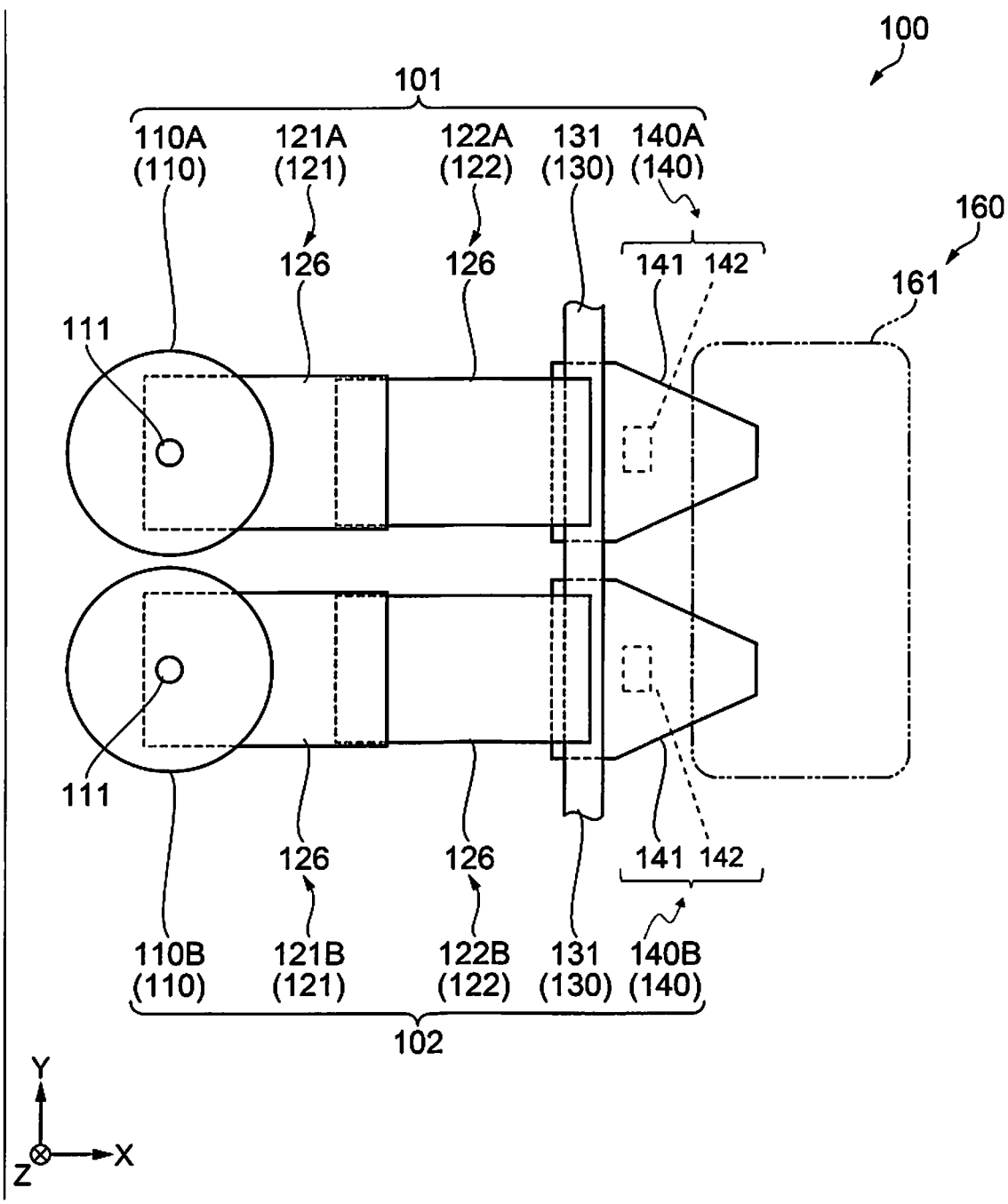
FIG. 2 is a schematic plan view of feedstock supply units of a defibrated material manufacturing device according to the embodiment.
Figure 3:
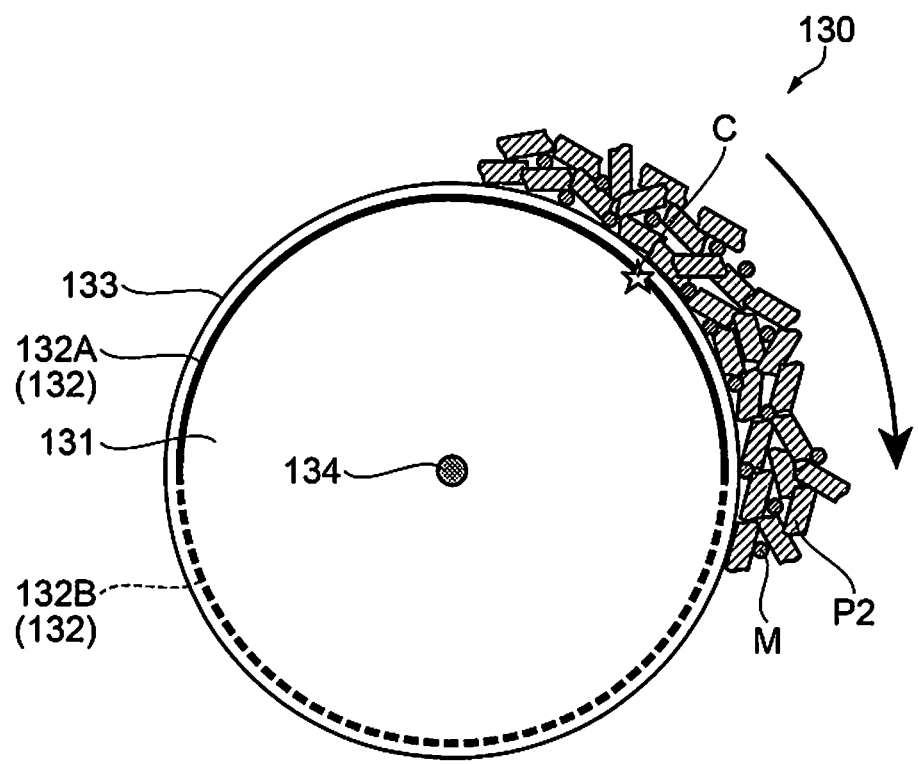
FIG. 3 is an enlarged view of a removal device.
Figure 4:
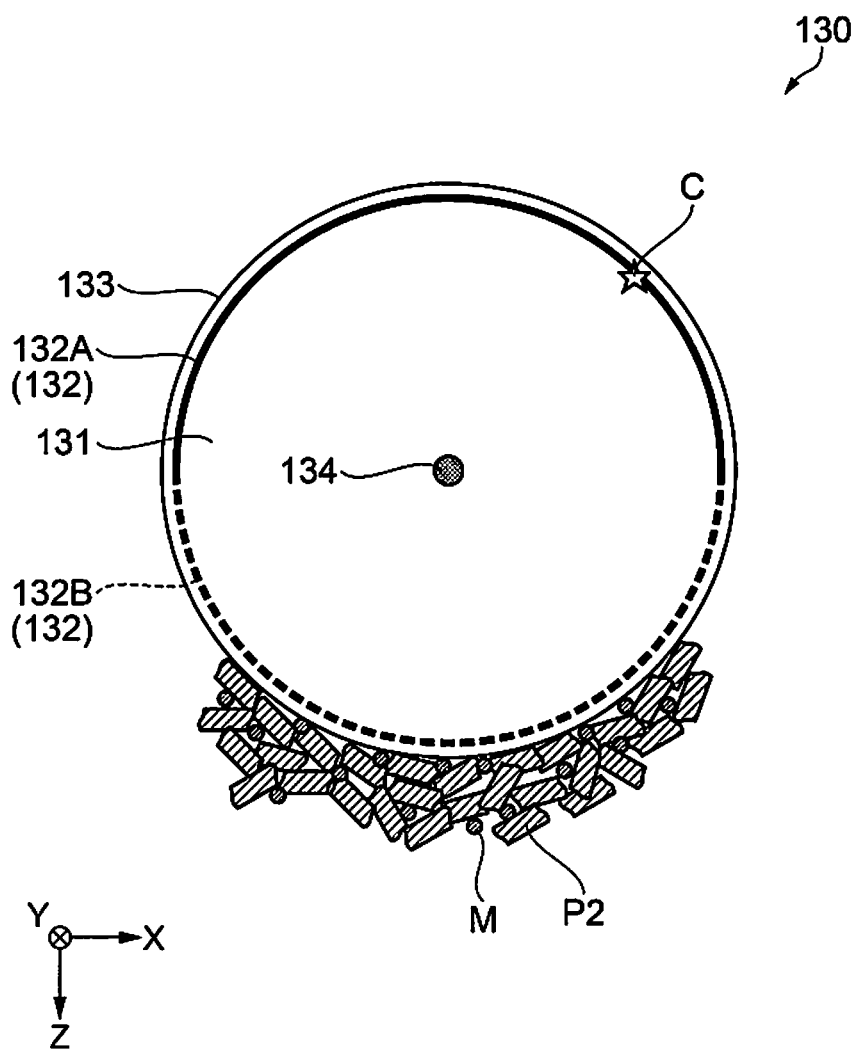
FIG. 4 is an enlarged view of the removal device.

FIG. 2 is a plan view of the defibrated material manufacturing device 100 as seen on the Z-axis, and illustrates the feedstock supply units 101, 102 of the defibrated material manufacturing device 100 according to this embodiment. FIG. 3 and FIG. 4 are enlarged views of a removal device 130 shown in FIG. 1, schematically illustrating shreds P that have dropped onto a magnet 131 (as an example of a first magnet) of the removal device 130.

FIG. 2 shows the elements of the feedstock supply units 101, 102, and the input hopper 161 of the defibrator 160 is indicated by the dot-dot-dash line.

In FIG. 3 and FIG. 4, a side 132 of the magnet 131 on the −Z-axis direction side (the side on the opposite side as the direction of gravity) is indicated by the bold solid line, and the side 132 of the magnet 131 on the +Z-axis direction side (the side on the side of the direction of gravity) is indicated by the bold dotted line. In other words, the side 132 indicated by the bold solid or dotted line in the figure is the curved surface of a cylindrical magnet 131 having its axis on the Y-axis. Below, the side 132 of the magnet 131 on the −Z-axis direction side indicated by the bold solid line is referred to as side 132A, and the side 132 of the magnet 131 on the +Z-axis direction side indicated by the bold dotted line is referred to as side 132B.

Note that side 132A of the magnet 131 is an example of a side on the opposite side as the direction of gravity.

The general configuration of the defibrated material manufacturing device 100 is described next with reference to FIG. 1 to FIG. 4.

The defibrated material manufacturing device 100 according to this embodiment uses clumps (coarse product D) of paper shreds (shreds P) containing fiber as the feedstock, and defibrates the feedstock (coarse product D) into defibrated material. The feedstock that is defibrated into defibrated material is material containing fiber, and in addition to paper shreds (paper), may be pulp, pulp sheets, cloth, including nonwoven cloth, or textiles, for example.

As shown in FIG. 1, the defibrated material manufacturing device 100 according to this embodiment includes an input hopper 110 into which feedstock (coarse product D) is loaded; one or more dividers 115; a vibratory linear feeder 120 that conveys the feedstock (coarse product D) by vibration in the +X-axis direction; a metering hopper 140 that measures feedstock (shreds P1 detangled from the coarse product D) conveyed from the vibratory linear feeder 120, and discharges the metered feedstock (shreds P1); and the defibrator 160 that defibrates the feedstock (shreds P1) supplied from the metering hopper 140 into defibrated material.

The removal device 130 is disposed between the vibratory linear feeder 120 and metering hopper 140. Described further below, the removal device 130 removes foreign matter (metallic foreign matter M) contained in the feedstock (shreds P) as non-fiber foreign matter (foreign matter not suited to making sheets S). In this embodiment, the removal device 130 is a magnetic removal device that includes the magnet 131.

More specifically, the defibrated material manufacturing device 100 has, disposed sequentially along the conveyance direction of the coarse product D, the input hopper 110, the dividers 115 and the vibratory linear feeder 120, the removal device 130, the metering hopper 140, and the defibrator 160. The vibratory linear feeder 120 of the defibrated material manufacturing device 100 can be a vibratory linear feeder that conveys feedstock (coarse product D) by vibration in the conveyance direction, and the removal device 130 is disposed downstream in the conveyance direction from the vibratory linear feeder 120.

Note that the vibratory linear feeder 120 is an example of a conveyance device. However, a conveyance device is not limited to the vibratory linear feeder 120. The conveyance device can be any type of vibration feeder. For example, the conveyance device can be a rotary vibration feeder. The metering hopper 140 is an example of a storage device and a metering device. In the embodiment, the metering device 140 and the storage device are integrated as one-piece body.

The coarse product D is clumps of shreds P containing fiber in multiple layers broken by a shredder or other type of grinder into pieces approximately 5 cm to 10 cm square. More specifically, the coarse product D are agglomerations of multiple shreds P. In this embodiment, the coarse product D formed by cutting feedstock with a shredder or other type of grinder are conveyed by a worker and loaded into the input hopper 110. The coarse product D loaded into the input hopper 110 is then discharged from the outlet 111 of the input hopper 110 onto a base 126 of the upstream vibratory linear feeder 121.

As described above, the defibrated material manufacturing device 100 in this embodiment does not include a shredder or other type of grinder, and coarse product D shredded by a device separate from the defibrated material manufacturing device 100 is loaded into the input hopper 110.

Note that shreds P, and the coarse product D that is an agglomeration of shreds P, are examples of feedstock.

The vibratory linear feeder 120 has an upstream vibratory linear feeder 121 on the upstream side (−X-axis side) in the conveyance direction, and a downstream vibratory linear feeder 122 on the downstream side (+X-axis side) in the conveyance direction. The upstream vibratory linear feeder 121 and downstream vibratory linear feeder 122 each have a drive device 125 and a base 126. The drive device 125 has an electromagnet (not shown in the figure) and a permanent magnet (not shown in the figure), and causes the base 126 to vibrate by changing the electromagnetic force produced by the electromagnet and permanent magnet.

The upstream vibratory linear feeder 121 and downstream vibratory linear feeder 122 convey the coarse product D loaded on the base 126 toward the metering hopper 140 by the vibration of the base 126.

More specifically, the upstream vibratory linear feeder 121 is disposed with the base 126 intersecting the XY plane (horizontal plane). In other words, the upstream vibratory linear feeder 121 is disposed with the base 126 inclined with the input hopper 110 end higher than the downstream vibratory linear feeder 122 end. When the base 126 vibrates, the coarse product D on the base 126 moves in the direction in which the base 126 slopes (the direction from the input hopper 110 to the downstream vibratory linear feeder 122 (+X-axis direction)). The direction of movement (conveyance direction) and the speed of movement (conveyance speed) of the coarse product D on the base 126 is adjusted by the slope of the base 126. For example, if the slope of the base 126 is steep, the coarse product D on the base 126 is conveyed more quickly than when the slope of the base 126 is gradual.

The dividers 115 are also disposed on the −Z-axis side of the base 126. When the coarse product D discharged from the input hopper 110 piles up on the base 126, the dividers 115 eliminate the piles of coarse product D on the base 126 so that the coarse product D discharged from the input hopper 110 is in direct contact with the base 126 in a roughly uniform arrangement on the base 126. As a result, contact of the coarse product D with the base 126 is smoothed, and the many coarse products D vibrate uniformly on the base 126.

The coarse product D is consistently conveyed D in the +X-axis direction by the vibration and the incline of the base 126, and is conveyed from the base 126 of the upstream vibratory linear feeder 121 to the base 126 of the downstream vibratory linear feeder 122.

The base 126 of the downstream vibratory linear feeder 122 is not inclined. However, the base 126 is disposed on the XY plane (horizontal plane). On the downstream vibratory linear feeder 122, the coarse product D fed first from the upstream vibratory linear feeder 121 is conveyed by being pushed in the +X-axis direction by the coarse product D fed next from the upstream vibratory linear feeder 121. More specifically, the coarse product D located on the downstream vibratory linear feeder 122 downstream in the conveyance direction is conveyed by being pushed by the coarse product D deposited on the upstream side in the conveyance direction, and is discharged toward the metering hopper 140.

For example, variation in the amount of feedstock conveyed per unit time occurs more easily when the base 126 of the downstream vibratory linear feeder 122 is inclined than when the base 126 of the downstream vibratory linear feeder 122 does not slope. This means that times when the amount of coarse product D conveyed is great, and times when the amount of coarse product D conveyed is little, can easily occur.

If a situation in which the amount of coarse product D conveyed by the downstream vibratory linear feeder 122 is sometimes great and the amount of coarse product D conveyed is sometimes little occurs, the amount of coarse product D supplied from the downstream vibratory linear feeder 122 to the metering hopper 140 will vary, and it becomes difficult for the metering hopper 140 to consistently weigh a specific amount of coarse product D at a specific rate. As a result, in this embodiment, the base 126 of the downstream vibratory linear feeder 122 is not inclined so that the amount of coarse product D supplied from the downstream vibratory linear feeder 122 to the metering hopper 140 does not vary. Accordingly, the coarse product D is consistently supplied at a constant speed from the downstream vibratory linear feeder 122 to the metering hopper 140.

The base 126 of the downstream vibratory linear feeder 122 is therefore preferably disposed on the XY plane (horizontal plane) so that coarse product D is consistently supplied at a specific speed from the downstream vibratory linear feeder 122 to the metering hopper 140.

As shown in FIG. 2, this embodiment has two input hoppers 110, two upstream vibratory linear feeders 121, two downstream vibratory linear feeders 122, and two metering hoppers 140.

More specifically, the input hopper 110 comprises a first input hopper 110A and a second input hopper 110B; the upstream vibratory linear feeder 121 comprises a first upstream vibratory linear feeder 121A and a second upstream vibratory linear feeder 121B; the downstream vibratory linear feeder 122 comprises a first downstream vibratory linear feeder 122A and a second downstream vibratory linear feeder 122B; and the metering hopper 140 comprises a first metering hopper 140A and a second metering hopper 140B.

In addition, between the first downstream vibratory linear feeder 122A and the first metering hopper 140A, and between the second downstream vibratory linear feeder 122B and the second metering hopper 140B, is disposed a common magnet 131 (removal device 130). Furthermore, while not shown in FIG. 2, common dividers 115 are disposed to each of the bases 126 of the upstream vibratory linear feeders 121A, 121B on the −Z-axis side.

The first input hopper 110A, the dividers 115, the first upstream vibratory linear feeder 121A, the first downstream vibratory linear feeder 122A, the removal device 130, and the first metering hopper 140A form the first feedstock supply unit 101 that supplies defibrated material feedstock (coarse product D) to the defibrator 160; and the second input hopper 110B, dividers 115, the second upstream vibratory linear feeder 121B, the second downstream vibratory linear feeder 122B, the removal device 130, and the second metering hopper 140B form the second feedstock supply unit 102 that supplies defibrated material feedstock (coarse product D) to the defibrator 160.

In this embodiment, a specific amount of defibrated material feedstock (a constant amount of defibrated material feedstock) is not supplied simultaneously to the defibrator 160 from both the first feedstock supply unit 101 and second feedstock supply unit 102, and instead a specific amount of defibrated material feedstock (a constant amount of defibrated material feedstock) is supplied to the defibrator 160 alternately from the first feedstock supply unit 101 and second feedstock supply unit 102. More specifically, a specific amount of defibrated material feedstock (a constant amount of defibrated material feedstock) is supplied to the defibrator 160 at a specific interval (specific speed) by the first feedstock supply unit 101 and second feedstock supply unit 102.

As described above, the metering hopper 140 can consistently weigh a specific amount of coarse product D at a constant speed as a result of coarse product D being consistently supplied at a constant rate from the downstream vibratory linear feeder 122 to the metering hopper 140. In addition, the conveyance speed of the downstream vibratory linear feeder 122 is set slow so that coarse product D is consistently supplied at a constant rate from the downstream vibratory linear feeder 122 to the metering hopper 140. As a result, the processing time required for the feedstock supply units 101 and 102 to produce a specific amount of defibrated feedstock is slower than the time required for the defibrator 160 to produce defibrated material, and the processing capacity of the feedstock supply units 101 and 102 is lower than the processing capacity of the defibrator 160.

This embodiment has the two feedstock supply units 101 and 102 that supply feedstock for defibrated material to the defibrator 160, and compared with a configuration having only one feedstock supply unit, the processing capacity of the feedstock supply units 101 and 102 is greater and equal to the processing capacity of the defibrator 160. In other words, the number of feedstock supply units is set so that the processing capacity of the feedstock supply units is equal to the processing capacity of the defibrator 160.

When the coarse product D is conveyed in the +X-axis direction by vibration by the upstream vibratory linear feeder 121 and downstream vibratory linear feeder 122, the coarse product D, which is clumps of many shreds P, is defibrated into individual shreds P.

More specifically, when the coarse product D, which is clumps of many shreds P, is conveyed by vibration in the +X-axis direction, a force that defibrates the many shreds P is applied by the vibration to the coarse product D. In other words, while the coarse product D is conveyed by the upstream vibratory linear feeder 121 and downstream vibratory linear feeder 122, a force defibrating the many shreds P works on the coarse product D due to the vibrations. As a result, when the coarse product D is conveyed by the upstream vibratory linear feeder 121 and downstream vibratory linear feeder 122, the coarse product D, which is clumps of many shreds P, is gradually defibrated, and on the downstream side in the conveyance direction (+X-axis direction side) of the downstream vibratory linear feeder 122, the coarse product D is defibrated into individual shreds P.

When the coarse product D is conveyed by the upstream vibratory linear feeder 121 and downstream vibratory linear feeder 122, the vibrating strength and frequency of vibration of the vibratory linear feeders 121, 122, and the length of the vibratory linear feeders 121, 122 in the conveyance direction, are set so that force defibrating the coarse product D into individual shreds P works sufficiently on the coarse product D. As a result, when the coarse product D is conveyed by the vibratory linear feeders 121, 122, the coarse product D, which is clumps of many shreds P, is defibrated.

In this way, the coarse product D loaded onto the base 126 of the vibratory linear feeder 120 (vibratory linear feeders 121, 122) is conveyed in the +X-axis direction by vibration, and is defibrated by the vibrations into individual shreds P. The shreds P defibrated from the coarse product D are then discharged as defibrated material feedstock from the downstream vibratory linear feeder 122. The shreds P discharged from the downstream vibratory linear feeder 122 drop in the +Z-axis direction (direction of gravity), and are supplied to the metering hopper 140.

As shown in FIG. 1 to FIG. 3, the removal device 130 is disposed between the downstream vibratory linear feeder 122 and the metering hopper 140. The removal device 130 includes the magnet 131, a coating 133 covering the magnet 131, and a rotating shaft 134 rotationally supporting the magnet 131.

Note that the coating 133 is an example of a resin.

The magnet 131 is a cylindrical member that is long in the axial direction of the rotating shaft 134 (the Y-axis), is removably installable to the housing (not shown in the figure) of the defibrated material manufacturing device 100, and is covered by the coating 133. The removal device 130 is disposed so as to contact the shreds P dropping in the +Z-axis direction. In particular, the magnet 131 is disposed to attract at least a part of the metallic foreign matter M and shreds P2 containing metallic foreign matter M (foreign matter) of the shreds P dropping in the +Z-axis direction such that at least the part of the metallic foreign matter M and the shreds P2 sticks to the removal device 130. The magnet 131 is a permanent magnet. The magnet 131 preferably has strong magnetic force, and in this embodiment, the magnet 131 is a neodymium magnet. A samarium-cobalt magnet, cobalt magnet, ferrite magnet, or Al—Ni—Co magnet, for example, may also be used for the magnet 131 instead of a neodymium magnet.

The shreds P discharged from the downstream vibratory linear feeder 122 drop toward area C on the side 132A of the magnet 131 as indicated by the star in the figure. More specifically, the shreds P (feedstock) dropping in the +Z-axis direction (direction of gravity) are attracted to the magnet 131 in area C. More specifically, the shreds P (feedstock) dropping in the +Z-axis direction (direction of gravity) meet the removal device 130 around area C. The area C where the shreds P (feedstock) dropping in the +Z-axis direction make contact the removal device 130 extends on the Y-axis on side 132A of the magnet 131. The angle of intersection between the plane formed by the area C and the rotating shaft 134, and the XY plane (horizontal plane), is approximately 45 degrees.

In other words, in this embodiment, the side 132A disposed on the −Z-axis direction side of the magnet 131 (the side opposite the direction of gravity) is arranged such that the removal device 130 contacts shreds P (feedstock) dropping in the +Z-axis direction (direction of gravity).

As described above, when the coarse product D is conveyed through the vibratory linear feeder 120, the coarse product D is separated into individual shreds P by the vibration.

The feedstock of the coarse product D fragmented by a shredder or other mill may include recovered paper held together by staples or paper clips, for example. If the recovered paper previously sorted to not contain staples or paper clips, for example, is shredded in a mill, the coarse product D will not contain metallic foreign matter M such as staples or paper clips. However, if sorting to remove staples and paper clips is deficient, the coarse product D fragmented by the mill may include metallic foreign matter M such as staples or paper clips. As a result, the shreds P separated from the coarse product D may contain metallic foreign matter M (such as staples or paper clips) separated from the shreds P, shreds P1 not containing metallic foreign matter M, and shreds P2 containing metallic foreign matter M.

As the shreds P drop to area C of the magnet 131, the metallic foreign matter M and shreds P2 containing metallic foreign matter M are pulled to the magnet 131 by magnetic attraction. The shreds P1 not containing metallic foreign matter M are not held by the magnetic force of the magnet 131, and therefore pass the magnet 131 and fall onto the metering hopper 140. By thus disposing the magnet 131 between the downstream vibratory linear feeder 122 and metering hopper 140, the metallic foreign matter M and the shreds P2 containing metallic foreign matter M are separated from the shreds P by magnetic force, and the shreds P1 not containing metallic foreign matter M is supplied to the metering hopper 140 as feedstock for defibrated material. In other words, the removal device 130 has the magnet 131 that attracts, by magnetic force, the metallic foreign matter M (foreign matter) and the shreds P2 containing metallic foreign matter M (foreign matter).

If the coarse product D containing metallic foreign matter M is not sufficiently separated into individual shreds P, and the coarse product D containing metallic foreign matter M is heavy, the coarse product D containing the metallic foreign matter M may not be attracted to the magnet 131, and may pass the magnet 131 and be supplied to the metering hopper 140. However, because the coarse product D containing metallic foreign matter M is broken into shreds P with a weight that can be captured by the magnet 131, the metallic foreign matter M and shreds P2 containing metallic foreign matter M are held by the magnet 131 and not supplied to the metering hopper 140.

More specifically, by breaking the coarse product D into individual shreds P by the conveyance and vibration of the upstream vibratory linear feeders 121, 122, the magnet 131 can remove any metallic foreign matter M from the feedstock supplied to the metering hopper 140 for defibration.

Note that the metallic foreign matter M and shreds P2 containing metallic foreign matter M are examples of foreign matter.

When the metallic foreign matter M and shreds P2 drop toward the area C of the magnet 131, the metallic foreign matter M and shreds P2 are pulled to the area C of the magnet 131. Note that the area around the area C includes the area C, the area on the +Z-axis direction side of the area C, and the area on the −Z-axis direction side of the area C.

When the metallic foreign matter M and shreds P2 stick to the area around the area C of the magnet 131, and the area around the area C of the magnet 131 is covered with much metallic foreign matter M and shreds P2, it becomes more difficult for the magnet 131 to attract metallic foreign matter M and shreds P2 containing metallic foreign matter M from the shreds P falling in the +Z-axis direction than when the area around the area C of the magnet 131 is not covered with metallic foreign matter M and shreds P2. Therefore, it becomes more difficult to reliably remove metallic foreign matter M and shreds P2 from the shreds P. As a result, when the area around the area C of the magnet 131 is covered with much metallic foreign matter M and shreds P2, the operator executes a cleaning operation of removing the magnet 131 from the defibrated material manufacturing device 100 and removing metallic foreign matter M and shreds P2 from the magnet 131.

Because the side 132A of the magnet 131 is on the −Z-axis direction side (the opposite side as the direction of gravity), when the area around the area C of the magnet 131 is covered with much metallic foreign matter M and shreds P2, a moment produced by the weight of the metallic foreign matter M and shreds P2 on the magnet 131 causes the magnet 131 to rotate in the direction of the arrow, and the magnet 131 turns automatically. When this happens, as shown in FIG. 4, the area C (area around the area C) onto which the shreds P falling in the +Z-axis direction changes from being covered with metallic foreign matter M and shreds P2 to being not covered with metallic foreign matter M and shreds P2. When the area around the area C of the magnet 131 to which the metallic foreign matter M and shreds P2 are attracted changes to not being covered with metallic foreign matter M and shreds P2, the magnet 131 can more easily attract the metallic foreign matter M and shreds P2 containing metallic foreign matter M from the shreds P falling in the +Z-axis direction than when the area C is covered by metallic foreign matter M and shreds P2. Accordingly, the metallic foreign matter M and shreds P2 containing metallic foreign matter M can be reliably removed from the shreds P falling in the +Z-axis direction.

When the removal device 130 is configured so that the magnet 131 turns automatically due to the weight of metallic foreign matter M and shreds P2 held by the magnet 131, the period during which the removal device 130 can reliably remove metallic foreign matter M and shreds P2 containing metallic foreign matter M from the shreds P falling in the +Z-axis direction can be increased compared with a configuration in which the magnet 131 does not turn automatically due to the weight of metallic foreign matter M and shreds P2 held by the magnet 131.

Note that when the angle of intersection between the plane formed by the area C and the rotating shaft 134, and the XY plane (horizontal plane), is approximately 45 degrees, the moment causing the magnet 131 to turn is greater than when angle of intersection between the plane formed by area C and the rotating shaft 134, and the XY plane (horizontal plane), is not approximately 45 degrees. Accordingly, the magnet 131 turns more easily in response to the weight of the metallic foreign matter M and shreds P2 held by the magnet 131.

In this embodiment, the side 132 of the magnet 131 is covered by the coating 133. The coating 133 comprises a resin with a lower coefficient of friction than the magnet 131 (neodymium magnet). More specifically, the coating 133 covering the magnet 131 is formed by wrapping the side 132 of the magnet 131 with Teflon® tape so that the side 132 of the magnet 131 is covered.

The coating 133 may be made from a general purpose resin such as ABS resin, polyvinyl chloride resin, polypropylene resin, polystyrene resin, or polyethylene resin; a resin with greater thermal resistance than a general purpose resin, such as a polyimide resin; a resin with greater chemical resistance than a general purpose resin, such as a Teflon®; a resin with greater mechanical strength than a general purpose resin, such as a nylon; rubber; or other material.

As described above, when the area around area C of the magnet 131 is covered with much metallic foreign matter M and shreds P2, the operator executes a cleaning operation of removing the magnet 131 from the defibrated material manufacturing device 100 and removing metallic foreign matter M and shreds P2 from the magnet 131. If the magnet 131 is covered with a resin (coating 133) with a lower coefficient of friction than the magnet 131, the operator can remove metallic foreign matter M and shreds P2 more easily from the magnet 131 in the cleaning operation than if the magnet 131 is not covered with a resin (coating 133) having a lower coefficient of friction than the magnet 131.

For example, the operator can easily remove the metallic foreign matter M and shreds P2 from the magnet 131 by removing the magnet 131 from the defibrated material manufacturing device 100 and wiping the magnet 131 with a nonwoven cloth.

Furthermore, if the material used for the coating 133 has a coefficient of friction lower than the coefficient of friction of the magnet 131 (neodymium magnet), the material is not limited to resin and may be a ceramic or metal alloy.

Of the material (shreds P1, shreds P2, metallic foreign matter M) falling from the downstream vibratory linear feeder 122 toward the area C of the magnet 131, the metallic foreign matter M and shreds P2 containing metallic foreign matter M are removed by the magnet 131, and shreds P1 not containing metallic foreign matter M in the material (shreds P1, shreds P2, metallic foreign matter M) falling from the downstream vibratory linear feeder 122 toward the area C of the magnet 131 are not captured by the magnet 131, fall past the magnet 131, and enter the metering hopper 140.

The metering hopper 140 includes a storage device 141 for storing shreds P1, and a load cell 142 that weighs the shreds P1. In other words, the metering hopper 140 comprises the load cell 142 for weighing the shreds P1 that has passed the removal device 130 (magnet 131), and a storage device 141 for storing a specific amount of shreds P1 weighed by the load cell 142.

The storage device 141 in this example is a container for holding the shreds P1.

The load cell 142 is a sensor that detects a force (weight, torque), and has a strain body that deforms proportionally to the force, and a strain gauge that measures the displacement (strain) of the strain body. The load cell 142 is disposed to the storage device 141, and weighs the weight of the shreds P1 held in the storage device 141.

The metering hopper 140 is thus configured with the load cell 142 attached to the storage device 141. In other words, the metering hopper 140 integrates an ability to store the shreds P1 (storage device 141) with an ability (load cell 142) to weigh the shreds P1. When configured with an ability to store shreds P1 (storage device 141) and an ability (load cell 142) to weigh the shreds P1, the defibrated material manufacturing device 100 can be configured more compactly than if the ability to store shreds P1 (storage device 141) and the ability (load cell 142) to weigh the shreds P1 are configured by separate devices (discrete configurations at separate locations).

When a specific amount of shreds P1 is measured by the metering hopper 140 (load cell 142), the metering hopper 140 tips to an incline as indicated by the dotted line in FIG. 1, the specific amount of shreds P1 is discharged from the metering hopper 140 and is deposited as a feedstock for defibration into the input hopper 161 of the defibrator 160. More specifically, a specific amount of shreds P1 from which metallic foreign matter M has been removed is supplied at a regular interval (constant speed) to the input hopper 161 of the defibrator 160 as material for defibration.

Note that the load cell 142 is an example of a scale and the metering hopper 140.

The defibrator 160 has an input hopper 161, a main unit 162, and an outlet 163.

The input hopper 161 stores and supplies to the main unit 162 a specific amount (specific weight) of shreds P1.

The main unit 162 may be an impeller mill, for example, comprising a rotor (not shown in the figure) that turns at high speed, and a liner (not shown in the figure) position around the outside of the rotor. The shreds P1 go between the rotor and the liner of the main unit 162, are ground by the relative rotation of the rotor and the liner, and defibrated into individual fibers. The main unit 162 produces an air current by rotation of the rotor. By this air current, the main unit 162 suctions the shreds P1, which is the feedstock, from the input hopper 161, and conveys the defibrated material resulting from defibrating the shreds P1 into individual fibers to the outlet 163.

The defibrated material is delivered from the outlet 163 to the conduit 3, and is supplied through the conduit 3 to the recycled paper manufacturing system 200. In other words, defibrated material from which metallic foreign matter M has been removed and which therefore does not contain metallic foreign matter is supplied as feedstock for sheets S to the recycled paper manufacturing system 200.

Because the defibrator 160 receives a specific amount (constant weight) of shreds P1 from the metering hopper 140 at a specific rate, and defibrates the shreds P1 into individual fibers, a specific amount (constant weight) of defibrated material (feedstock for sheets S) is supplied at a constant speed from the defibrator 160 to the recycled paper manufacturing system 200. Because the recycled paper manufacturing system 200 receives a specific amount (constant weight) of defibrated material (feedstock for a sheet S) at a constant speed from the defibrator 160, the recycled paper manufacturing system 200 can consistently manufacture sheets S of a specific density or specific thickness. In addition, because the defibrated material does not contain metallic foreign matter M that lowers the quality of the sheets S, the sheets S with a high quality can be consistently manufactured from the defibrated material.

If the weight or the supply rate of the defibrated material received from the defibrator 160 varies, the density or thickness of the sheet S manufactured by the recycled paper manufacturing system 200 will also vary. As a result, the weight and supply speed of the defibrated material (feedstock for a sheet S) supplied from the defibrated material manufacturing device 100 to the recycled paper manufacturing system 200 are preferably constant.

As described above, to stabilize the quality of the sheet S manufactured by the recycled paper manufacturing system 200, maintaining a constant ratio of the sheet S feedstock (defibrated material) and resin ratio in the mixing device 50 is important. As a result, the feedstock (defibrated material) of the sheet S is preferably weighed before the sheet S feedstock (defibrated material) reaches the mixing device 50, so that a specific amount (constant weight) of sheet S feedstock is supplied to the mixing device 50.

Because the volume increases greatly when the shreds P1 is defibrated into individual fibers, if the amount of sheet S feedstock is weighed after defibration into individual fibers, the configuration of elements used to weigh the feedstock of the sheet S increases in size. However, by weighing the feedstock of the sheet S before defibration into individual fibers, the configuration of elements used to weigh the feedstock of the sheet S can be compactly configured.

As a result, a configuration that weighs the feedstock of the sheet S before being defibrated into individual fibers, that is, a configuration for weighing the feedstock of the sheet S (shreds P) by means of the metering hopper 140 disposed upstream in the conveyance direction from the defibrator 160, is preferable.

For example, if the removal device 130 is located downstream from the metering hopper 140 in the conveyance direction of the shreds P, metallic foreign matter M and shreds P2 containing metallic foreign matter M will be removed by the removal device 130 (magnet 131) from the shreds P of the specific weight after the metering hopper 140 weighs the specific amount (weight) of shreds P (shreds P1, shreds P2, metallic foreign matter M) separated from the coarse product D. As a result, the weight of the feedstock for defibrated material (sheet S feedstock) supplied to the defibrator 160 will vary according to the amount of metallic foreign matter M and shreds P2 containing metallic foreign matter M removed from the weighed amount of shreds P.

Therefore, to maintain a constant weight of feedstock (sheet S feedstock) supplied to the defibrator 160 for defibration, the removal device 130 is preferably located upstream from the metering hopper 140 in the conveyance direction of the shreds P, and the metering hopper 140 weighs shreds P1 from which metallic foreign matter M and shreds P2 containing metallic foreign matter M have been removed by the removal device 130 to determine the weight of the feedstock for defibration (sheet S feedstock). Therefore, the removal device 130 is preferably disposed downstream from the vibratory linear feeder 120 in the conveyance direction, and upstream from the metering hopper 140 in the conveyance direction.

If metallic foreign matter M such as staples or paper clips is contained in the feedstock for defibration (defibrated material), the metallic foreign matter M will also be ground by the defibrator 160 and mixed as minute metallic foreign matter M (such as metallic foreign matter M of approximately 1 mm) with the defibrated material, and minute particles of metallic foreign matter M will be contained in the sheets S produced using the contaminated defibrated material as the feedstock.

When fine metallic foreign matter M is contained in the sheet S, the cutters (not shown in the figure) of the cutting device 90 that cut the sheet S may be chipped, requiring replacing the cutters of the cutting device 90. Because the cutters of the cutting device 90 are expensive, replacing the cutters increases the maintenance (operating) cost of the recycled paper manufacturing system 200, and reduces the productivity (operation rate) of the recycled paper manufacturing system 200.

Furthermore, fine metallic foreign matter M contained in the sheet S may also damage the printing device used to print on the sheet S. For example, the print head and conveyance rollers of the printing device may be scratched by the metallic foreign matter M contained in the sheet S, possibly requiring repairing or replacing the print head or conveyance rollers. Because the print head and conveyance rollers are also expensive, repairing the printing device will also be expensive.

Since the feedstock (defibrated material) produced by this embodiment to manufacture sheets S does not contain metallic foreign matter M, the sheets S manufactured from the produced defibrated material therefore do not contain metallic foreign matter M. This embodiment therefore prevents such problems.

The invention is not limited to the foregoing embodiments, can be varied in many ways without departing from the scope and concept of the invention as will be understood from the accompanying claims and foregoing description, and various modifications of the foregoing embodiments are conceivable. Examples of some variations are described below.

First Variation

Figure 5:
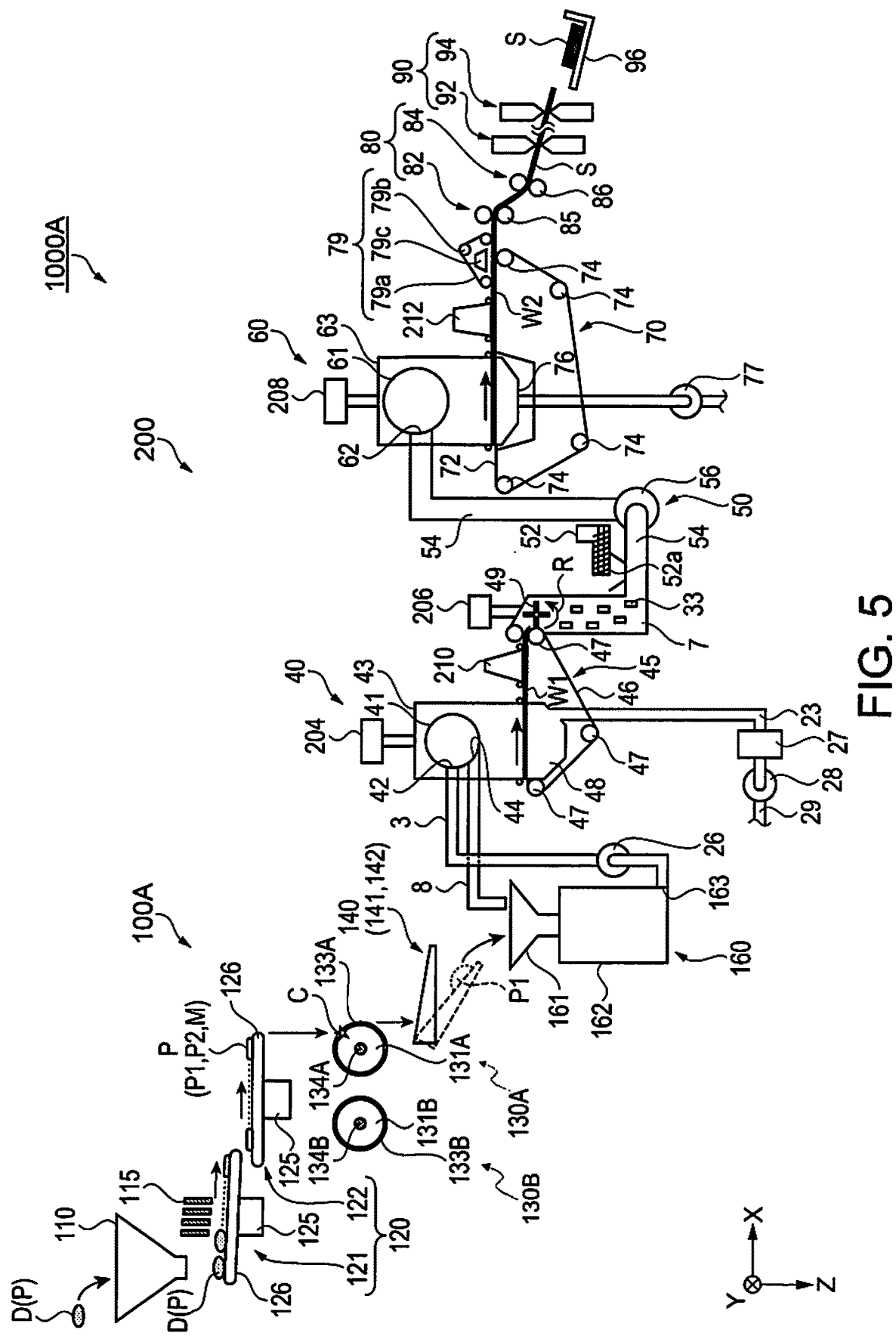
FIG. 5 schematically illustrates the configuration of a sheet manufacturing apparatus according to a first variation.

FIG. 5 schematically illustrates the configuration of a sheet manufacturing apparatus according to a first variation of the foregoing embodiment.

The sheet manufacturing apparatus 100A according to this variation differs from the defibrated material manufacturing device 100 according to the foregoing embodiment in the configuration of the removal device.

The sheet manufacturing apparatus 1000A according to this variation is described below with reference to FIG. 5 and focusing on the differences with the foregoing embodiment. In addition, The same parts in this variation and the foregoing embodiment are identified by the same reference numerals, and redundant description is omitted.

As shown in FIG. 5, the sheet manufacturing apparatus 1000A according to this variation comprises the sheet manufacturing apparatus 100A that breaks clumps (coarse product D) of shreds P containing fiber into defibrated material, and the recycled paper manufacturing system 200 that manufactures new paper (a sheet S) from the defibrated material.

The recycled paper manufacturing system 200 according to this variation has the same configuration as the recycled paper manufacturing system 200 according to the embodiment described above.

The sheet manufacturing apparatus 100A according to this variation has the input hopper 110, the dividers 115, the vibratory linear feeder 120, a removal device 130A, a removal device 130B, the metering hopper 140, and the defibrator 160.

The removal device 130A includes a magnet 131A, a coating 133A, and a rotating shaft 134A, and the removal device 130B includes a magnet 131B, a coating 133B, and a rotating shaft 134B. In the embodiment described above, the sheet manufacturing apparatus 100 includes one removal device (removal device 130). This is the main difference between this example and the embodiment described above.

Note that the magnet 131A is an example of a first magnet, and the magnet 131B is an example of a second magnet.

The sheet manufacturing apparatus 100A according to this variation also has a moving means (not shown in the figure) that swaps the positions of the removal device 130A (the magnet 131A, the coating 133A, and the rotating shaft 134A), and the removal device 130B (the position magnet 131B, the coating 133B, and the rotating shaft 134B). This moving mechanism changes the position of the magnet 131A to the position of the magnet 131B, and the position of magnet 131B to the position of magnet 131B. More specifically, the removal device 130A is movably disposed between a position at which the shreds P (feedstock) dropping in the +Z-axis direction contact the removal device 130A and a position away from the shreds P dropping in the +Z-axis direction. Moreover, the removal device 130B is movably disposed between the position at which the shreds P dropping in the +Z-axis direction contact the removal device 130B and a position away from the shreds P dropping in the +Z-axis direction. Also, each of the first magnet 131A and the second magnet 131B is movably disposed between a position to attract at least a part of the metallic foreign matter M and the shreds P2 of the shreds P dropping in the direction of gravity and a position away from the shreds P dropping in the +Z-axis direction. As one example, at least one of the removal device 130A and the removal device 130B can have the moving mechanism. In FIG. 5, the position to attract at least the part of the metallic foreign matter M and the shreds P2 of the shreds P dropping in the direction of gravity corresponds to a position where the magnet 131A is located, and the position away from the shreds P dropping in the +Z-axis direction corresponds to a position where the magnet 131B is located.

This is another difference between this variation and the embodiment described above.

The removal device 130A is configured such that magnet 131A attracts at least the part of the metallic foreign matter M and the shreds P2 of the shreds P discharged from the downstream vibratory linear feeder 122, and the removal device 130B is located such that the magnet 131B is disposed to a position separated from the shreds P discharged from the downstream vibratory linear feeder 122. In other words, when the shreds P are discharged from the downstream vibratory linear feeder 122 and the shreds P (feedstock) flows, the magnet 131A is disposed so as to attracts at least the part of the metallic foreign matter M and the shreds P2 of the shreds P (feedstock), and the magnet 131B is disposed so as to be separated from the shreds P (feedstock).

That is, when shreds P are discharged from the downstream vibratory linear feeder 122 and the shreds P drop in the +Z-axis direction, the removal device 130A contacts the shreds P, and the removal device 130B does not contact the shreds P and is separated from the shreds P.

When the shreds P discharged from the downstream vibratory linear feeder 122 contact the removal device 130A, the metallic foreign matter M and shreds P2 containing metallic foreign matter M are pulled to the magnet 131A by magnetic attraction, and the metallic foreign matter M and shreds P2 containing metallic foreign matter M are removed from the shreds P discharged from the downstream vibratory linear feeder 122.

When the area around the area C of the magnet 131A is covered with much metallic foreign matter M and shreds P2 containing metallic foreign matter M, it becomes difficult for the magnet 131A to reliably remove metallic foreign matter M and shreds P2 containing metallic foreign matter M from the shreds P. Accordingly, the moving mechanism changes the position of the magnet 131A and the position of the magnet 131B so that the magnet 131A is removed from the path of shreds P discharged from the downstream vibratory linear feeder 122, and the magnet 131B is positioned to attract at least the part of the metallic foreign matter M and shreds P2 of the shreds P discharged from the downstream vibratory linear feeder 122.

In other words, when it becomes difficult for the magnet 131A to capture additional metallic foreign matter M and shreds P2, the moving mechanism moves the magnet 131A away from the shreds P and positions the magnet 131B to attract at least the part of the metallic foreign matter M and shreds P2 of the shreds P. More specifically, the moving mechanism moves the removal device 130A away from the path of shreds P discharged from the downstream vibratory linear feeder 122 and moves the removal device 130B to contact the shreds P.

As a result, the area C onto which the shreds P falling in the +Z-axis direction fall changes from being covered with metallic foreign matter M and shreds P2 (magnet 131A) to being not covered with metallic foreign matter M and shreds P2 (magnet 131B). Accordingly, metallic foreign matter M and shreds P2 can be reliably removed from the shreds P discharged from the downstream vibratory linear feeder 122 by the repositioned magnet 131B.

This configuration (a configuration having two magnets 131A and 131B), compared with a configuration having one magnet 131, can increase the length of time the removal devices 130A and 130B can reliably remove metallic foreign matter M and shreds P2 containing metallic foreign matter M.

For example, the cleaning process of removing metallic foreign matter M and shreds P2 containing metallic foreign matter M from the magnet 131A can be performed after the position of the magnet 131A and the position of the magnet 131B are interchanged without stopping the defibrated material manufacturing device 100, there is no need to stop the defibrated material manufacturing device 100 for the cleaning operation, and the productivity (operation rate) of the defibrated material manufacturing device 100 can be further improved.

Note that this variation is not limited to a configuration that moves the magnet 131A away from the shreds P stream and positions the magnet 131B to attract at least the part of the metallic foreign matter M and the shreds P2 the shreds P when it becomes difficult for the magnet 131A to attract new metallic foreign matter M and shreds P2. For example, a configuration that predicts when it will become difficult for the magnet 131A to attract metallic foreign matter M and shreds P2, and moves the magnet 131A away from the shreds P stream and positions the magnet 131B to attract at least the part of the metallic foreign matter M and the shreds P2 of the shreds P before it becomes difficult for the magnet 131A to attract new metallic foreign matter M and shreds P2, is also conceivable. For example, the magnet 131A may be separated from the shreds P, and the magnet 131B repositioned to attract at least the part of the metallic foreign matter M and the shreds P2 of the shreds P, when a specific time has past.

Second Variation

Figure 6:
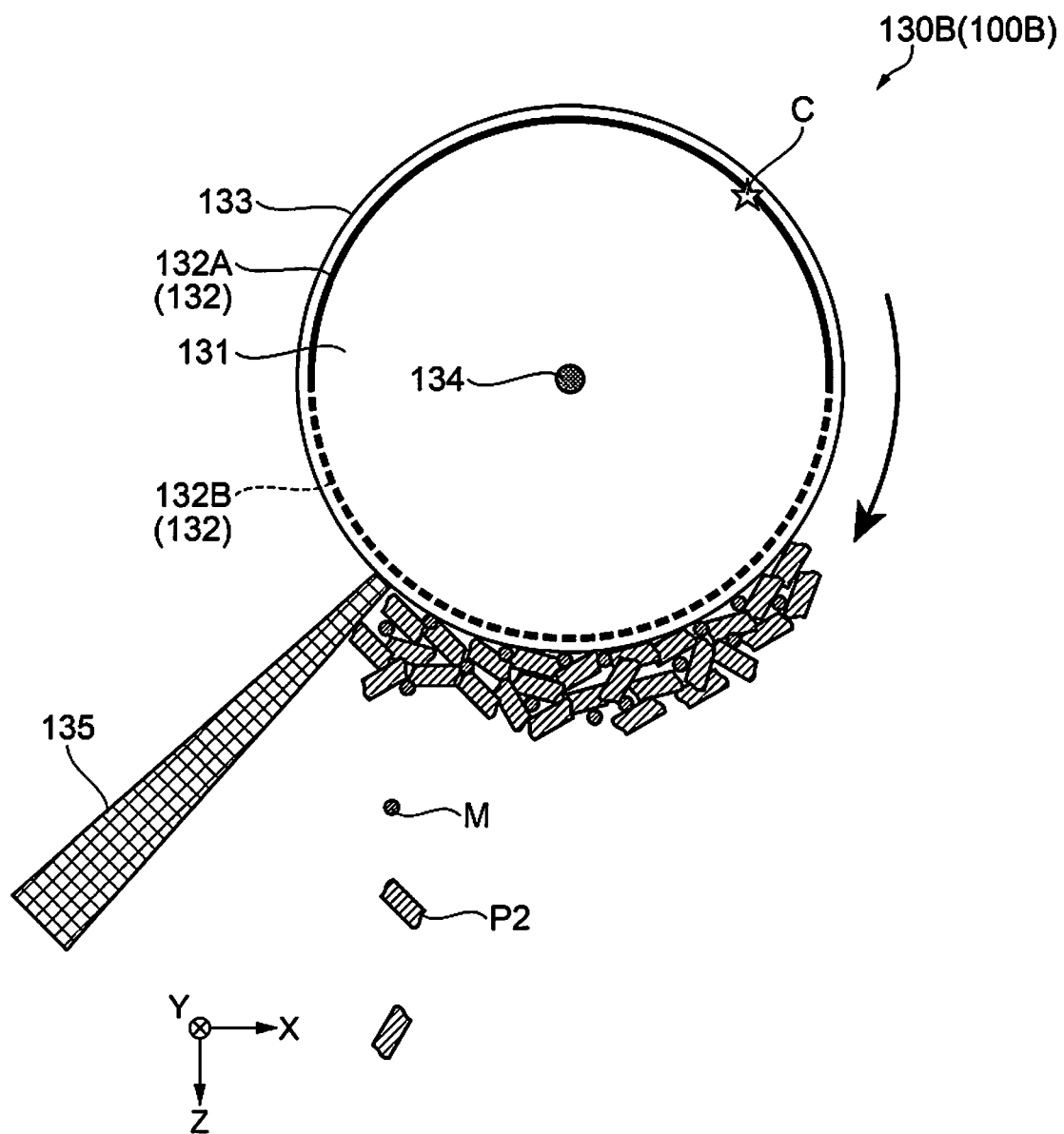
FIG. 6 is an enlarged view of a removal device according to a second variation.

FIG. 6 corresponds to FIG. 3, and is an enlarged view of a removal device according to a second variation of the foregoing embodiment.

A sheet manufacturing apparatus 1000B according to this variation is described below with reference to FIG. 6 and focusing on the differences with the foregoing embodiment. In addition, the same parts in this variation and the foregoing embodiment are identified by the same reference numerals, and redundant description is omitted.

As shown in FIG. 6, the removal device 130B of the defibrated material manufacturing device 100B according to this variation has a scraper 135 in addition to the magnet 131, the coating 133, and the rotating shaft 134. In other words, the removal device 130B according to this variation also has the scraper 135 that removes from the magnet 131 metallic foreign matter M and shreds P2 containing metallic foreign matter M attracted by magnetic force to the magnet 131. The removal device 130 of the defibrated material manufacturing device 100 in the embodiment described above has the magnet 131, the coating 133, and the rotating shaft 134, but does not have the scraper 135. This is the main difference between this variation and the embodiment described above.

The removal device 130B also has a drive mechanism (not shown in the figure) that turns the magnet 131. This is another difference between this variation and the embodiment described above.

The scraper 135 is, for example, a flexible member made from rubber or other elastomer, and is disposed to contact the side 132 (more precisely, the coating 133) of the magnet 131.

When shreds P discharged from the downstream vibratory linear feeder 122 contact the magnet 131, the metallic foreign matter M and shreds P2 containing metallic foreign matter M is attracted by magnetic force to the area around area C of the magnet 131, and metallic foreign matter M and shreds P2 are removed from the shreds P discharged from the downstream vibratory linear feeder 122.

When the area around area C of the magnet 131 is covered with much metallic foreign matter M and shreds P2, the drive mechanism causes the magnet 131 to turn in the direction of the arrow in FIG. 6. Note that when the magnet 131 is turned by the drive mechanism, the position of the scraper 135 does not change. When only the magnet 131 is driven by the drive mechanism, the metallic foreign matter M and shreds P2 containing metallic foreign matter M held to the side 132 by magnetic force is scraped off (removed) by the scraper 135.

In other words, the removal device 130B has the scraper 135 that removes from the magnet 131 metallic foreign matter M and shreds P2 containing metallic foreign matter M held to the magnet 131 by magnetic force.

As a result, the area C onto which the shreds P falling in the +Z-axis direction fall changes from being covered with metallic foreign matter M and shreds P2 containing metallic foreign matter M to being not covered with metallic foreign matter M and shreds P2 containing metallic foreign matter M. Moreover, the magnet 131 from which metallic foreign matter M and shreds P2 containing metallic foreign matter M are removed by the scraper 135 can continue to reliably remove metallic foreign matter M and shreds P2 containing metallic foreign matter M from the shreds P discharged from the downstream vibratory linear feeder 122.

If the removal device 130B has a scraper 135 that removes from the magnet 131 metallic foreign matter M and shreds P2 containing metallic foreign matter M held to the magnet 131 by magnetic force, a cleaning operation in which the operator manually removes from the magnet 131 metallic foreign matter M and shreds P2 containing metallic foreign matter M can be omitted, and the convenience and usability of the defibrated material manufacturing device 100B can be improved.

Third Variation

The magnet 131 of the removal device 130 in the embodiment described above is a permanent magnet such as a neodymium magnet, but the magnet 131 is not limited to the permanent magnet. The magnet 131 of the removal device 130 may be an electromagnet, for example.

If the magnet 131 of the removal device 130 is an electromagnet, the magnetic force of the magnet 131 can be electrically controlled. As a result, when there is much metallic foreign matter M and shreds P2 containing metallic foreign matter M on the magnet 131, the magnetic strength of the magnet 131 can be reduced by controlling energizing of the magnet 131, and metallic foreign matter M and shreds P2 containing metallic foreign matter M can be easily removed from the magnet 131.

Fourth Variation

The removal device 130 in the foregoing embodiment uses magnetism to remove impurities not suitable for manufacturing sheets S, but the removal device 130 is not limited to the foregoing embodiment. For example, the removal device 130 may have a cyclone classifier that uses differences in specific gravity to remove impurities not suitable for manufacturing sheets S.

Fifth Variation

The metering hopper 140 in the foregoing embodiment integrates an ability to store shreds P1 (storage device 141) with an ability (load cell 142) to weigh the shreds P1. However, the metering hopper 140 may be configured with the ability to store shreds P1 (storage device 141) disposed separately from the ability (load cell 142) to weigh the shreds P1.

Furthermore, the metering hopper 140 described above weighs a specific amount of shreds P1 with the load cell 142. More specifically, the metering hopper 140 measures a specific amount of shreds P1 based on the weight of the shreds P1, but the metering hopper 140 is not limited to the foregoing embodiment. For example, the metering hopper 140 may measure a specific amount of shreds P1 based on the surface area of the shreds P1. For example, a specific amount of shreds P1 may be conveyed at a constant rate by a belt conveyor configuration, and the metering hopper 140 may be configured to measure a specific amount of shreds P1 based on the conveyance speed of the belt conveyor. For example, the metering hopper 140 may be configured to measure a specific amount of shreds P1 by image processing an image of the shreds P1 enabling evaluating the surface area of the shreds P1 or the conveyance speed of the belt conveyor.

Sixth Variation

The magnet 131 that removes metallic foreign matter M is disposed between the vibratory linear feeder 120 and the metering hopper 140 of the defibrated material manufacturing device 100, but the magnet 131 is not limited to the foregoing embodiment. In the defibrated material manufacturing device 100, the magnet 131 that removes metallic foreign matter M may be disposed between the vibratory linear feeder 120 and the metering hopper 140, between the input hopper 110 and the vibratory linear feeder 120, between the upstream vibratory linear feeder 121 and the downstream vibratory linear feeder 122, between the metering hopper 140 and the defibrator 160, or between the defibrator 160 and the recycled paper manufacturing system 200.

Further alternatively, in the recycled paper manufacturing system 200, the magnet 131 that removes metallic foreign matter M may be disposed between the screener 40 and the mixing device 50, between the mixing device 50 and the air-laying device 60, or between the air-laying device 60 and the sheet forming device 80.

More specifically, the magnet 131 that removes metallic foreign matter M may be desirably disposed between the input hopper 110 of the defibrated material manufacturing device 100 to which feedstock (coarse product D) for defibrated material is introduced, and the sheet forming device 80 of the recycled paper manufacturing system 200 that manufactures a sheet S, and the magnet 131 that removes metallic foreign matter M may be disposed at one location or at multiple locations.

Seventh Variation

The defibrated material manufacturing device 100 in the embodiment described above does not have a shredder or other type of mill, receives the coarse product D shredded by a device separate from the defibrated material manufacturing device 100, and produces defibrated material (feedstock for sheets S) from the coarse product D. However, the defibrated material manufacturing device 100 is not limited to the foregoing embodiment. The defibrated material manufacturing device 100 may be a configuration incorporating a shredder or other type of mill.

Eighth Variation

The embodiment described above has two feedstock supply units that supply feedstock for defibrated material to the defibrator 160, but the number of feedstock supply units may be less than two or more than two. More specifically, the number of feedstock supply units may be adjusted so that the processing capacity of the feedstock supply units equals the processing capacity of the defibrator 160.

Ninth Variation

A sheet as used herein refers to paper (print media) suitable for forming images by ink discharged from nozzles of a printing device, for example. However, a sheet as referred to herein is a medium formed from fiber molded in a specific form, and is not limited to paper used for printing by a printing device. For example, the sheet may be a fluid absorbent medium or sound absorbent medium of fiber shaped in a specific form. For example, a sheet according to the invention may also be a nonwoven cloth or fiber board of fiber shaped in a specific form.

Therefore, a sheet manufacturing apparatus according to the invention is not limited to a manufacturing apparatus (sheet manufacturing apparatus 1000) that manufactures paper suitable to use in a printing device, and may be a manufacturing apparatus that manufactures moldings of fiber shaped in a specific form, including fluid absorbent media, sound absorbent media, nonwoven cloth, and fiber board. The defibrated material manufacturing device 100 can be desirably adapted to a manufacturing apparatus that manufactures moldings of fiber shaped in a specific form, including fluid absorbent media, sound absorbent media, nonwoven cloth, and fiber board.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

Examples

Example 1: A defibrated material manufacturing device configured to defibrate a feedstock of clumps of shreds containing fiber into defibrated material, including: a removal device configured to remove at least a part of foreign matter contained in the feedstock; a metering device configured to measure the feedstock that has passed the removal device; a storage device configured to store the feedstock measured by the metering device; and a defibrator configured to defibrate the weighed feedstock supplied from the storage device into the defibrated material.

At least a portion of foreign matter contained in the feedstock is removed by the removal device, the feedstock is weighed by the metering device after the foreign matter is removed, and the weighed feedstock is supplied as feedstock to be defibrated from a storage device to the defibrator (comminuting means). Because a measured amount of feedstock from which foreign matter was removed is supplied to the defibrator, the defibrator can defibrate a measured amount of feedstock to produce defibrated material.

More specifically, a measured amount of feedstock from which at least a portion of any foreign matter was removed is supplied to the defibrator, the quantity of defibrated material produced by the defibrator can be controlled.

Example 2: The defibrated material manufacturing device described above, also including a conveyance device configured to convey the feedstock by vibration; the removal device being disposed on a downstream side of the conveyance device in the conveyance direction.

When the defibrated material manufacturing device has a conveyance device for conveying feedstock by vibration, and the feedstock consists of clumps (agglomerations) of multiple pieces of recovered paper that are stuck together, the clumps of recovered paper are separated by the vibration into individual pieces of recovered paper. If, for example, foreign matter contained in the clumps of recovered paper is hard to remove, foreign matter on the surface of the recovered paper is easy to remove, and the clumps of recovered paper are separated by the vibration into individual pieces of recovered paper, the foreign matter will be at the surface of the recovered paper, and the removal device can more easily remove the foreign matter from the recovered paper.

Foreign matter can be more easily removed from the recovered paper when clumps of recovered paper are separated by the vibration into individual pieces of recovered paper in this way. As a result, the primary removal means and shredding means of a recovered paper recycling system (defibrated material manufacturing device) according to the related art can be omitted, particulate (defibrated material) that becomes feedstock for paper can be produced by the secondary removal device and shredder, that is, the removal device and defibrator, from the recovered paper after foreign matter is removed, and the recovered paper recycling system (defibrated material manufacturing device) can be compactly configured.

Example 3: The defibrated material manufacturing device described above, wherein: preferably the metering device and the storage device are configured in unison.

By integrating the metering device and storage device, the defibrated material manufacturing device can be configured more compactly than when the metering device and storage device are not integrated.

Example 4: The defibrated material manufacturing device described above, wherein: preferably the removal device has a magnet that attracts at least part of the foreign matter.

When the removal device has a magnet, the removal device can use magnetism to remove metal and shreds containing metal. As a result, metal and other foreign matter can be removed from the feedstock of the defibrated material, and the defibrated material produced by the defibrator does not contain metal.

Example 5: The defibrated material manufacturing device described above, wherein: preferably the removal device has a rotating shaft configured to rotationally support the magnet; the magnet is a member long in the axial direction of the rotating shaft, and is disposed to contact the feedstock dropping in a direction of gravity; and a side of the magnet on the opposite side as the direction of gravity contacts the feedstock dropping in the direction of gravity.

The magnet in this configuration is a member long in the axial direction of the rotating shaft, is disposed so that feedstock dropping in the direction of gravity contacts the opposite side of the magnet as the side in the direction of gravity. When metal and shreds containing metal is attracted to the opposite side of the magnet as the downward side in the direction of gravity, the weight of the metal and shreds containing metal held on the magnet produce a moment causing the magnet to turn. When the magnet turns, the side of the magnet that feedstock falling in the direction of gravity contacts changes from a state covered with metal and shreds containing metal to a state not covered with metal and shreds containing metal.

When the side of the magnet that feedstock falling in the direction of gravity contacts changes to a state not covered with metal and shreds containing metal, the magnet can more easily capture metal and shreds containing metal from the feedstock dropping in the direction of gravity than when coated with metal and shreds containing metal, and can more easily remove metal and shreds containing metal from the feedstock dropping in the direction of gravity.

Example 6: The defibrated material manufacturing device described above, wherein: preferably the magnet is coated with resin.

When the magnet is holding a lot of metal and shreds containing metal, it is more difficult for the magnet to attract metal and shreds containing metal from the feedstock falling in the direction of gravity than when the magnet is not holding a lot of metal and shreds containing metal on the surface. Therefore, when the magnet is holding a lot of metal and shreds containing metal on the surface, a cleaning operation must be performed to remove the metal and shreds containing metal from the surface the magnet.

Because metal and shreds containing metal can be removed from the magnet more easily when the magnet is coated with resin, the magnet can be appropriately and easily cleaned.

Example 7: The defibrated material manufacturing device described above, wherein: preferably removal device has a scraper configured to remove from the magnet at least a part of the foreign matter accreted on the magnet.

When the defibrated material manufacturing device has a scraper for removing from the magnet at least some of the foreign matter sticking to the magnet, a cleaning process can be efficiently applied to the magnet by the scraper. For example, there is no need for the operator to manually clean the magnet, and the cleaning operation can be executed automatically by the defibrated material manufacturing device using the scraper.

Example 8: The defibrated material manufacturing device described above, preferably also including: a first magnet disposed to contact the feedstock when the feedstock flows, and a second magnet disposed away from the feedstock; the removal device configured to position the first magnet at a position away from the feedstock, and position the second magnet to contact the feedstock.

When the feedstock flows, at least some of the foreign matter sticks to the first magnet, and it becomes difficult for the first magnet to attract new foreign matter, the first magnet is moved to a position away from the stream of feedstock, and the second magnet is moved to the position contacting the feedstock. As a result, at least some of the foreign matter can be reliably removed by the second magnet.

Furthermore, if the first magnet is cleaned while foreign matter is being removed by the second magnet, the defibrated material manufacturing device does not need to be stopped for cleaning, and the productivity (operation rate) of the defibrated material manufacturing device can be improved.

Example 9: The defibrated material manufacturing device described above, wherein: the feedstock preferably includes recovered paper.

The productivity (operation rate) of a defibrated material manufacturing device that defibrates recovered paper to produce defibrated material can be improved even when recovered paper is used as the feedstock.

Example 10: A sheet manufacturing apparatus according includes the defibrated material manufacturing device described above.

The defibrated material manufacturing device described above executes a cleaning process that preemptively prevents stopping of conveyance, increases the time that defibrated material can be produced, and improves the productivity (operation rate) of the defibrated material manufacturing device. The time that defibrated material can be produced therefore also be increased, and productivity (operation rate) improved, in a sheet manufacturing apparatus including the defibrated material manufacturing device described above.

Example 11: The sheet manufacturing apparatus described above, also including: a mixing device configured to mix the defibrated material supplied from the defibrated material manufacturing device with resin; a web forming device configured to form a web from a mixture of the defibrated material and the resin; and a sheet forming device configured to form a sheet by a process including at least one of compressing and heating the web.

If the sheet manufacturing apparatus includes a defibrated material manufacturing device with improved productivity (operation rate), a mixing device that mixes resin with defibrated material supplied from the defibrated material manufacturing device, a web forming device that forms a web from a mixture of the defibrated material and the resin; and a sheet forming device configured to form a sheet by a process including at least one of compressing and heating the web, the sheet manufacturing time and productivity (operation rate) can also be improved in the sheet manufacturing apparatus.

Other objects and attainments together with a fuller understanding of the invention will become apparent and appreciated by referring to the following description and claims taken in conjunction with the accompanying drawings.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A defibrated material manufacturing device configured to defibrate a feedstock of clumps of shreds containing fiber into defibrated material, the defibrated material manufacturing device comprising:
   a conveyance device configured to convey the feedstock by vibration, and to discharge the feedstock, the conveyance device including a vibratory linear feeder including
      a base on which the feedstock is disposed, and
      a drive device configured to vibrate the base;
   a removal device configured to remove at least a part of foreign matter contained in the feedstock, the removal device having
      a first magnet configured to attract at least the part of the foreign matter, the first magnet being disposed below the conveyance device so that an upper side of the first magnet contacts the feedstock dropping from the conveyance device in a direction of gravity, and
      a rotating shaft rotationally supporting the first magnet so that the first magnet rotates due to a moment produced by a weight of the part of the foreign matter attached to the first magnet, the first magnet extending along an axial direction of the rotating shaft;
   a metering device configured to measure the feedstock that has passed the removal device;
   a storage device configured to store a measured feedstock measured by the metering device; and
   a defibrator configured to defibrate the measured feedstock supplied from the storage device into the defibrated material.

2. The defibrated material manufacturing device according to claim 1, wherein
   the metering device and the storage device are configured in unison.

3. The defibrated material manufacturing device according to claim 1, wherein
   the removal device further has resin that coats the first magnet.

4. The defibrated material manufacturing device according to claim 1, wherein
   the removal device further has a scraper configured to remove from the removal device at least the part of the foreign matter accreted on the removal device.

5. The defibrated material manufacturing device according to claim 1, further comprising:
   a second magnet disposed away from the feedstock dropping in the direction of gravity, wherein
   the removal device is configured to switch relative positions of the first magnet and the second magnet with respect to the feedstock dropping in the direction of gravity so that the first magnet is positioned at a position away from the feedstock dropping in the direction of gravity, and the second magnet is positioned to attract at least the part of the foreign matter of the feedstock dropping in the direction of gravity.

6. The defibrated material manufacturing device according to claim 1, wherein
   the feedstock includes recovered paper.

7. A sheet manufacturing apparatus comprising:
   the defibrated material manufacturing device according to claim 1.

8. The sheet manufacturing apparatus according to claim 7, further comprising:
   a mixing device configured to mix the defibrated material supplied from the defibrated material manufacturing device with resin;
   a web forming device configured to form a web from a mixture of the defibrated material and the resin; and
   a sheet forming device configured to form a sheet by a process including at least one of compressing and heating the web.

9. The defibrated material manufacturing device according to claim 1, wherein
   the metering device is configured to weight the feedstock that has passed the removal device.

10. The defibrated material manufacturing device according to claim 1, wherein
    the metering device and the storage device are integrated as one-piece body.

11. The defibrated material manufacturing device according to claim 1, further comprising:
    a second magnet movably disposed between a position away from the feedstock dropping in the direction of gravity and a position to attract at least the part of the foreign matter of the feedstock dropping in the direction of gravity, wherein
    the first magnet is movably disposed between the position to attract at least the part of the foreign matter of the feedstock dropping in the direction of gravity and the position away from the feedstock dropping in the direction of gravity.

12. The defibrated material manufacturing device according to claim 1, wherein
    the conveyance device further includes an upstream vibratory linear feeder disposed upstream of the vibratory linear feeder, the upstream vibratory linear feeder including
       an upstream base on which the feedstock is disposed, and
       an upstream drive device configured to vibrate the upstream base.

13. The defibrated material manufacturing device according to claim 12, wherein
    the upstream base of the upstream vibratory linear feeder slopes downwardly toward the vibratory linear feeder.

14. A defibrated material manufacturing device configured to defibrate a feedstock of clumps of shreds containing fiber into defibrated material, the defibrated material manufacturing device comprising:
    a conveyance device configured to convey the feedstock by vibration, and to discharge the feedstock, the conveyance device including a vibratory linear feeder including
       a base on which the feedstock is disposed, and
       a drive device configured to vibrate the base;

a magnetic removal device being configured to remove at least a part of foreign matter contained in the feedstock, the magnetic removal device having
  a first magnet configured to attract at least the part of the foreign matter, the first magnet being disposed below the conveyance device so that an upper side of the first magnet contacts the feedstock dropping from the conveyance device in a direction of gravity, and
  a rotating shaft rotationally supporting the first magnet so that the first magnet rotates due to a moment produced by a weight of the part of the foreign matter attached to the first magnet, the first magnet extending along an axial direction of the rotating shaft;
a cell load configured to measure the feedstock that has passed the magnetic removal device;
a container configured to store a measured feedstock measured by the cell load; and
a defibrator configured to defibrate the measured feedstock supplied from the container into the defibrated material.

* * * * *